United States Patent
Odeh et al.

(10) Patent No.: US 9,492,785 B2
(45) Date of Patent: *Nov. 15, 2016

(54) UV AND THERMALLY TREATED POLYMERIC MEMBRANES

(71) Applicant: SABIC Global Technologies B.V., Amsterdam (NL)

(72) Inventors: Ihab N. Odeh, Sugar Land, TX (US); Lei Shao, Thuwal (SA)

(73) Assignee: SABIC Global Technologies B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/031,649

(22) PCT Filed: Dec. 15, 2014

(86) PCT No.: PCT/US2014/070322
§ 371 (c)(1),
(2) Date: Apr. 22, 2016

(87) PCT Pub. No.: WO2015/095034
PCT Pub. Date: Jun. 25, 2015

(65) Prior Publication Data
US 2016/0250585 A1    Sep. 1, 2016

Related U.S. Application Data

(60) Provisional application No. 61/916,602, filed on Dec. 16, 2013.

(51) Int. Cl.
*B01D 53/22* (2006.01)
*B01D 69/04* (2006.01)
(Continued)

(52) U.S. Cl.
CPC ............. *B01D 53/228* (2013.01); *B01D 53/22* (2013.01); *B01D 67/009* (2013.01);
(Continued)

(58) Field of Classification Search
CPC .............. B01D 53/22; B01D 53/228; B01D 2053/221; B01D 2053/223; B01D 2053/224; B01D 67/0083; B01D 67/009; B01D 67/0095; B01D 69/00; B01D 69/04; B01D 69/06; B01D 69/08; B01D 71/64; B01D 2256/24; B01D 2257/702; B01D 2257/7022
See application file for complete search history.

(56) References Cited

U.S. PATENT DOCUMENTS 4,156,597 A    5/1979    Browall ............................ 95/47
4,468,506 A    8/1984    Holub et al. .................. 525/432
(Continued)

FOREIGN PATENT DOCUMENTS

CA    2600808    7/2013
CN    1898008    1/2007
(Continued)

OTHER PUBLICATIONS

Roberson, Llyod M., "The upper bound revisited", Journal of Membrane Science, 2008, 320, pp. 390-400.*
(Continued)

*Primary Examiner* — Jason M Greene
(74) *Attorney, Agent, or Firm* — Norton Rose Fulbright US LLP

(57) ABSTRACT

Disclosed are polymeric blend membranes, and methods for their use, that include a blend of at least a first polymer and a second polymer, wherein the first and second polymers are each selected from a polymer of intrinsic microporosity (PIM), a polyetherimide (PEI) polymer, a polyimide (PI) polymer, or a polyetherimide-siloxane (PEI-Si) polymer, and wherein the polymeric membranes have been both ultraviolet (UV)-treated and thermally-treated.

19 Claims, 5 Drawing Sheets

(51) Int. Cl.
    *B01D 69/06* (2006.01)
    *B01D 69/08* (2006.01)
    *B01D 71/64* (2006.01)
    *B01D 67/00* (2006.01)
    *B01D 69/00* (2006.01)

(52) U.S. Cl.
    CPC ..... *B01D 67/0083* (2013.01); *B01D 67/0095* (2013.01); *B01D 69/00* (2013.01); *B01D 69/04* (2013.01); *B01D 69/06* (2013.01); *B01D 69/08* (2013.01); *B01D 71/64* (2013.01); *B01D 2053/221* (2013.01); *B01D 2053/223* (2013.01); *B01D 2053/224* (2013.01); *B01D 2256/24* (2013.01); *B01D 2323/345* (2013.01)

(56) References Cited

U.S. PATENT DOCUMENTS

| | | | |
|---|---|---|---|
| 4,607,088 A | 8/1986 | Nomura et al. | 526/279 |
| 4,657,564 A | 4/1987 | Langsam | 95/51 |
| 4,828,585 A | 5/1989 | Chiao | 95/47 |
| 4,933,132 A | 6/1990 | Vora | 264/331.14 |
| 5,028,453 A | 7/1991 | Jeffrey et al. | 427/575 |
| 5,055,116 A | 10/1991 | Kohn et al. | 95/47 |
| 5,095,060 A | 3/1992 | Haaf | 524/293 |
| 5,106,915 A | 4/1992 | Rock et al. | 525/431 |
| 5,181,940 A | 1/1993 | Bikson et al. | 95/47 |
| RE34,296 E | 6/1993 | Roesink et al. | 521/50 |
| 5,246,743 A | 9/1993 | Kusuki et al. | 427/567 |
| 5,248,319 A | 9/1993 | Ekiner et al. | 95/54 |
| 5,443,728 A | 8/1995 | Macheras et al. | 210/500.23 |
| 5,514,276 A | 5/1996 | Babcock et al. | 210/490 |
| 5,635,067 A | 6/1997 | Macheras | 210/500.23 |
| 5,647,894 A | 7/1997 | Ohara et al. | 96/13 |
| 5,707,895 A | 1/1998 | Wuu et al. | 438/158 |
| 5,837,032 A | 11/1998 | Moll et al. | 95/45 |
| 5,869,172 A | 2/1999 | Caldwell | 428/306.6 |
| 5,910,274 A | 6/1999 | Macheras et al. | 264/41 |
| 6,383,265 B1 | 5/2002 | Ekiner | 96/10 |
| 6,399,159 B1 | 6/2002 | Grace et al. | 427/536 |
| 6,431,182 B1 | 8/2002 | Rakhshandehroo et al. | 134/1.2 |
| 6,500,233 B1 | 12/2002 | Miller et al. | 95/50 |
| 6,508,860 B1 | 1/2003 | Kulkarni et al. | 95/51 |
| 6,585,802 B2 | 7/2003 | Koros et al. | 95/51 |
| 6,730,364 B2 | 5/2004 | Hong et al. | 427/535 |
| 6,946,211 B1 | 9/2005 | Bjerrum et al. | 429/480 |
| 7,018,445 B2 | 3/2006 | Simmons et al. | 95/51 |
| 7,048,846 B2 | 5/2006 | White et al. | 208/208 R |
| 7,306,647 B2 | 12/2007 | Miller et al. | 95/45 |
| 7,361,800 B2 | 4/2008 | Herrera et al. | 585/818 |
| 7,381,858 B2 | 6/2008 | Huff, Jr. et al. | 585/805 |
| 7,410,525 B1 | 8/2008 | Liu et al. | 95/45 |
| 7,432,311 B2 | 10/2008 | Mezzenga et al. | 521/64 |
| 7,485,173 B1 | 2/2009 | Liu et al. | 95/45 |
| 7,531,120 B2 | 5/2009 | Van Rijn et al. | 264/299 |
| 7,637,983 B1 | 12/2009 | Liu et al. | 95/45 |
| 7,658,784 B2 | 2/2010 | Fritsch et al. | 95/45 |
| 7,690,514 B2 | 4/2010 | McKeown et al. | 210/500.22 |
| 7,758,751 B1 | 7/2010 | Liu et al. | 210/321.6 |
| 7,785,397 B2 | 8/2010 | Kumar et al. | 95/51 |
| 7,806,962 B2 | 10/2010 | Liu et al. | 95/45 |
| 7,815,712 B2 | 10/2010 | Liu et al. | 95/45 |
| 7,846,496 B2 | 12/2010 | Liu et al. | 427/244 |
| 7,942,274 B2 | 5/2011 | Kools et al. | 210/500.22 |
| 7,943,543 B1 | 5/2011 | Liu et al. | 502/4 |
| 7,950,529 B2 | 5/2011 | Kulkarni et al. | 210/500.39 |
| 7,998,246 B2 | 8/2011 | Liu et al. | 95/45 |
| 8,034,857 B2 | 10/2011 | Kailasam et al. | 524/115 |
| 8,048,198 B2 | 11/2011 | Liu et al. | 95/45 |
| 8,056,732 B2 | 11/2011 | McKeown et al. | 210/500.22 |
| 8,127,936 B2 | 3/2012 | Liu et al. | 210/500.39 |
| 8,226,862 B2 | 7/2012 | Liu et al. | 264/45.9 |
| 8,241,501 B2 | 8/2012 | Liu et al. | 210/640 |
| 8,268,934 B2 | 9/2012 | Gallucci et al. | 525/397 |
| 8,318,013 B2 | 11/2012 | Zhou et al. | 210/321.72 |
| 8,337,598 B2 | 12/2012 | Yates et al. | 96/10 |
| 8,561,812 B2 | 10/2013 | Liu et al. | 210/500.39 |
| 8,613,362 B2 | 12/2013 | Liu et al. | 210/500.39 |
| 2004/0198587 A1 | 10/2004 | McKeown et al. | 502/100 |
| 2004/0258952 A1 | 12/2004 | Haghighat et al. | 428/690 |
| 2006/0138043 A1 | 6/2006 | Kharul et al. | 210/490 |
| 2006/0194070 A1 | 8/2006 | Croll et al. | 428/473.5 |
| 2006/0196355 A1* | 9/2006 | Ekiner | B01D 53/228 95/45 |
| 2006/0249018 A1 | 11/2006 | Wang et al. | 95/45 |
| 2007/0202038 A1 | 8/2007 | Yaghi et al. | 423/702 |
| 2008/0119615 A1 | 5/2008 | Gallucci et al. | 525/418 |
| 2008/0119616 A1 | 5/2008 | Donovan et al. | 525/432 |
| 2008/0142440 A1 | 6/2008 | Liu et al. | 210/640 |
| 2008/0214687 A1 | 9/2008 | Muller et al. | 521/54 |
| 2008/0295691 A1 | 12/2008 | Liu et al. | 95/285 |
| 2008/0296527 A1 | 12/2008 | Liu et al. | 252/60 |
| 2009/0099299 A1 | 4/2009 | Gallucci et al. | 524/538 |
| 2009/0120875 A1 | 5/2009 | Liu et al. | 210/641 |
| 2009/0126567 A1 | 5/2009 | Liu et al. | 95/45 |
| 2009/0149313 A1 | 6/2009 | Liu et al. | 502/4 |
| 2009/0149565 A1 | 6/2009 | Liu et al. | 522/148 |
| 2009/0152755 A1 | 6/2009 | Liu et al. | 264/115 |
| 2009/0155464 A1 | 6/2009 | Liu et al. | 427/243 |
| 2010/0018926 A1 | 1/2010 | Liu et al. | 210/655 |
| 2010/0186588 A1 | 7/2010 | Yaghi et al. | 95/127 |
| 2010/0216899 A1 | 8/2010 | Allen et al. | 521/27 |
| 2010/0242723 A1 | 9/2010 | Liu et al. | 95/46 |
| 2010/0243556 A1 | 9/2010 | Kools et al. | 210/490 |
| 2010/0243567 A1 | 9/2010 | Liu et al. | 210/640 |
| 2010/0244306 A1 | 9/2010 | Tang | 264/165 |
| 2010/0313752 A1 | 12/2010 | Powell et al. | 95/45 |
| 2010/0320142 A1 | 12/2010 | Ge et al. | 210/500.27 |
| 2011/0023716 A1 | 2/2011 | Liu et al. | 96/4 |
| 2011/0059036 A1 | 3/2011 | Arnold et al. | 424/78.01 |
| 2011/0104509 A1 | 5/2011 | Poulsson et al. | 428/524 |
| 2011/0130611 A1* | 6/2011 | Gonzalez | B01D 53/228 585/818 |
| 2011/0138999 A1 | 6/2011 | Willis | 95/45 |
| 2011/0168624 A1 | 7/2011 | Wang et al. | 210/497.1 |
| 2012/0042777 A1 | 2/2012 | Lee et al. | 95/47 |
| 2012/0064283 A1 | 3/2012 | Hill et al. | 428/113 |
| 2012/0085233 A1 | 4/2012 | Liu et al. | 95/51 |
| 2012/0118011 A1 | 5/2012 | Terrien et al. | 62/619 |
| 2012/0121497 A1 | 5/2012 | Terrien et al. | 423/437.1 |
| 2012/0264589 A1 | 10/2012 | Du et al. | 502/4 |
| 2012/0276300 A1 | 11/2012 | Liu et al. | 427/521 |
| 2012/0322119 A1* | 12/2012 | Liu | B01D 53/228 435/161 |
| 2012/0322911 A1 | 12/2012 | Liu et al. | 522/164 |
| 2013/0121892 A1 | 5/2013 | Fuhrmann et al. | 422/502 |
| 2013/0197235 A1 | 8/2013 | Thompson et al. | 548/103 |
| 2013/0217799 A1 | 8/2013 | Visser et al. | 521/180 |
| 2013/0247756 A1 | 9/2013 | Li et al. | 95/45 |
| 2013/0274087 A1 | 10/2013 | Da Silva Pinto et al. | 502/4 |
| 2013/0305920 A1 | 11/2013 | Yang et al. | 95/45 |
| 2013/0305927 A1 | 11/2013 | Choi et al. | 96/13 |
| 2013/0313193 A1 | 11/2013 | Nair et al. | 210/650 |
| 2014/0255636 A1* | 9/2014 | Odeh | B01D 53/228 428/36.5 |
| 2014/0345456 A1 | 11/2014 | Sano et al. | 95/51 |
| 2015/0283520 A1 | 10/2015 | Hill et al. | 95/45 |
| 2016/0158703 A1 | 6/2016 | Priske et al. | 568/454 |

FOREIGN PATENT DOCUMENTS

| | | |
|---|---|---|
| CN | 101733026 A | 6/2010 |
| CN | 101837228 | 9/2010 |
| CN | 103084078 | 5/2013 |
| EP | 0354514 | 2/1990 |
| EP | 0368447 | 5/1990 |
| EP | 0417513 | 3/1991 |
| EP | 0622111 | 11/1994 |
| EP | 0706819 | 4/1996 |
| EP | 1523053 | 4/2005 |
| EP | 2060315 | 5/2009 |
| JP | 588503 | 1/1983 |
| JP | 588517 | 1/1983 |

(56) References Cited

FOREIGN PATENT DOCUMENTS

| | | |
|---|---|---|
| JP | 6178406 | 4/1986 |
| JP | 61107923 | 5/1986 |
| JP | 6219206 | 1/1987 |
| JP | 63229123 | 9/1988 |
| JP | 02126927 | 5/1990 |
| JP | 0549882 | 3/1993 |
| JP | 05329342 | 12/1993 |
| JP | 07124449 | 5/1995 |
| JP | 7236822 | 9/1995 |
| JP | 03331153 | 10/2002 |
| JP | 2003251162 | 9/2003 |
| JP | 2003251163 | 9/2003 |
| JP | 03473300 | 12/2003 |
| JP | 2004002808 | 1/2004 |
| JP | 2012072534 | 4/2012 |
| JP | 5049882 | 10/2012 |
| JP | 2013075264 | 4/2013 |
| KR | 19950007320 | 7/1995 |
| WO | WO 83/03416 | 10/1983 |
| WO | WO 02/004083 | 1/2002 |
| WO | WO 02/43937 | 6/2002 |
| WO | WO 2005/012397 | 2/2005 |
| WO | WO 2005113121 | 12/2005 |
| WO | WO 2006/135966 | 12/2006 |
| WO | WO 2007/044473 | 4/2007 |
| WO | WO 2008076599 | 6/2008 |
| WO | WO 2008/140788 | 11/2008 |
| WO | WO 2009064571 | 5/2009 |
| WO | WO 2009075947 | 6/2009 |
| WO | WO 2009075952 | 6/2009 |
| WO | WO 2009076025 | 6/2009 |
| WO | WO 2009092922 | 7/2009 |
| WO | WO 2009/113747 | 9/2009 |
| WO | WO 2010002404 | 1/2010 |
| WO | WO 2010110968 | 1/2012 |
| WO | WO 2012082537 | 6/2012 |
| WO | WO 2012/112112 | 8/2012 |
| WO | WO 2012/159224 | 11/2012 |
| WO | WO 2013057492 | 4/2013 |
| WO | WO 2013073828 | 5/2013 |
| WO | WO 2013/122247 | 8/2013 |
| WO | WO 2014/137923 | 9/2014 |

OTHER PUBLICATIONS

Yong, W.F. et al., "Molucular engineering of PIM-1/Matrimid blend membranes for gas separation", Journal of Membrane Science, Mar. 2012, 407-408, pp. 47-57.*
Du et al., "Advances in high permeability polymeric membrane materials for $CO_2$ separations", *Energy Environ. Sci.* 5:7306-7322, 2012.
Du et al., "Azide-based Cross-Linking of Polymers of Intrinsic Microporosity (PIMs) for Condensable Gas Separation", *Macromolecular Rapid Communications* 32:631-636, 2011.
Du et al., "Decarboxylation-Induced Cross-Linking of Polymers of Intrinsic Microporosity (PIMs) for Membrane Gas Separation", *Macromolecules*, vol. 45, 12, pp. 5134-5139 (2012).
Du et al., "High-Performance Carboxylated Polymers of Intrinsic Microporosity (PIMs) with Tunable Gas Transport Properties", *Macromolecules*, vol. 42, 16, pp. 6038-6043 (2009).
Ghanem et. al., High-Performance Membranes from Polyimides with Intrinsic Microporosity, *Adv. Mater.* 2008, 20, 2766-2771.
Hasegawa et al., "Selective Oxidation of Carbon Monoxide in Hydrogen-Rich Mixtures by Permeation Through a Platinum-Loaded Y-Type Zeolite Membrane", *Journal of Membrane Science* 190:1-8, 2001.
International Preliminary Report on Patentability for PCT/US2014/070322, mailed Apr. 6, 2016.
International Search Report and Written Opinion for PCT/US2014/070322, mailed Mar. 31, 2015.
Khan et al., "Cross-linking of Polymer of Intrinsic Microporosity (PIM-1) via nitrene reaction and its effect on gas transport property", accepted manuscript for *European Polymer Journal*, 2013.
L. M. Robeson, Correlation of separation factor versus permeability for polymeric membranes, *J. Membr. Sci.*, 62 (1991) 165-185.
Li et al., "High-Performance Thermally Self-Cross-Linked Polymer of Intrinsic Microporosity (PIM-1) Membranes for Energy Development", *Macromolecules* 45:1427-1437, 2012.
Li et al., "Physical aging, high temperature and water vapor permeation studies of UV-rearranged PIM-1 membranes for advanced hydrogen purification and production", *International Journal of Hydrogen Energy*, vol. 38, 23, p. 9786-9793 (2013).
Li et al., "UV-Rearranged PIM-1 Polymeric Membranes for Advanced Hydrogen Purification and Production", *Advanced Energy Materials* 2:1456-1466, 2012.
Makhseed et al., "Phthalimide based polymers of intrinsic microporosity", *Polymer*, vol. 53, 14, pp. 2964-2972 (2012).
McKeown et al., "Exploitation of Intrinsic Microporosity in Polymer-Based Materials", *Macromolecules* 43:5163-5176, 2010.
Yong et al., "High performance PIM-1/Matrimid hollow fiber membranes for $CO_2/CH_4$, $O_2/N_2$ and $CO_2/N_2$ separation", *Journal of Membrane Science*, vol. 443, pp. 156-169 (2013).
Yong et al., "Highly permeable chemically modified PIM-1/Matrimid membranes for green hydrogen purification", *J. Mater. Chem. A* 1:13914-13925, 2013.
Yong et al., "Molecular engineering of PIM-1/Matrimid blend membranes for gas separation", *Journal of Membrane Science* 407-408:47-57, 2012.
Aaron et al., "Separation of CO2 from flue gas: a review", Sep. Sci. Technol. 40 (2005) 321-348.
Asako Shigero Machine Translation of JP 61-107923, 1986, pp. 13.
Askari et al., "Natural gas purification and olefin/paraffin separation using thermal cross-linkable co-polyimide/ZIF-8 mixed matrix membranes", Journal of Membrane Science 444(2013) 173-183.
Banerjee et al., "Control of Pore Size and Functionality in Isoreticular Zeolitic Imidazolate Frameworks and their Carbon Dioxide Selective Capture Properties", J. Am. Chem. Soc 131(2009) 3875-3877.
Banerjee, et al., "High-throughput synthesis of zeolitic imidazolate frameworks and application to CO2 capture", Science., 2008, 319:939-943.
Budd et al., "Gas separation membranes from polymers of intrinsic microporosity", J. Membrane Sci., 2005, 251, 263-269.
Chung et al., "Mixed matrix membranes (MMMs) comprising organic polymers with dispersed inorganic fillers for gas separation" Prog. Polym. Sci. 32 (2007) 483-507.
Cravillon et al., "Rapid Room-Temperature Synthesis and Characterization of Nanocrystals of a Prototypical Zeolitic Imidazolate Framework" Chem. Mater. 2009, 21, 1410-1412.
Dai, Y. et al. "Ultem®/ZIF-8 Mixed Matrix Hollow Fiber Membranes for Co2/IN2 Separations." Journal of Membrane Science. vols. 401-402, pp. 76-82. 2012.
European Office Action issued in European Patent Application No. 14872862.9, dated Aug. 2, 2016.
European Office Action issued in European Patent Application No. 14872632.6, dated Aug. 2, 2016.
Falcaro et al., "Patterning Techniques for Metal Organic Frameworks", Adv Mater., 24: 3153-3168, 2012.
Fritsch, D. et al. "High performance organic solvent nanofiltration membranes: Development and thorough testing of thin film composite membranes made of polymers of intrinsic microporosity (PIMs)." Journal of Membrane Science, Elsevier Scientific Publ. Company, vol. 401, pp. 222-231. 2012.
Hayashi et al., "Zeolite A imidazolate frameworks", Nature Mater. 6 (2007) 501-506.
Hibshman, C. L. Polyimide-Organosilicate Hybrid Materials. Thesis. Virginia Polytechnic Institute and State University. May 3, 2002.
Hillock et al., "Crosslinked mixed matrix membranes for the purification of natural gas: Effects of sieve surface modification", Journal of Membrane Science. 2008, 314:193-199.
Hopkins et al., "CF4 Plasma Treatment of Asymmetric Polysulfone Membranes", Langmuir, 12: 3666-3670, 1996.
International Preliminary Report on Patentability for PCT/US2014/070306, mailed Apr. 6, 2016.

(56) References Cited

OTHER PUBLICATIONS

International Preliminary Report on Patentability for PCT/US2014/070335, mailed Apr. 6, 2016.
International Search Report and Written Opinion for PCT/US2014/070306, mailed Mar. 26, 2015.
International Search Report and Written Opinion issued in PCT/US2014/070327, dated Mar. 18, 2015.
Kaba et al., "Fluorinated-Plasma Modification of Polyetherimide Films", Journal of Applied Polymer Science, 100: 3579-3588, 2006.
Koros et al., "Pushing the limits on possibilities for large scale gas separation: which strategies?", J. Membr. Sci., 175 (2000) 181.
Kramer et al., "Low Temperature Plasma for the Preparation of Separation Membranes", Journal of Membrane Sciences, 46: 1-28, 1989.
Lin et al., "Gas Permeabilities of Poly(trimethylsilylpropyne) Membranes Surface Modified with CF4 Plasma", Journal of Applied Polymer Science, 48: 231-236, 1993.
Machine Translation of JP 3331153B 2002, pp. 13.
Mahajan, et al., "Challenges in forming successful mixed matrix membranes with rigid polymeric materials", J Appl. Polym. Sci., 2002, 86:881.
Matsuyama et al., "Effect of plasma treatment on CO2 permeability and selectivity of poly(dimethylsiloxane) membrane", Journal of Membrane Science, 99: 139-147, 1995.
Mersmann et al., "The potential of energy saving by gas-phase adsorption processes", Chem. Eng. Technol. 23 (2000) 937-944.
Moore et al., "Hybrid membrane materials comprising organic polymers with rigid dispersed phases", AIChE J., 50 (2004) 311.
Morris et al., "Crystals as Molecules: Postsynthesis Covalent Functionalization of Zeolitic Imidazolate Frameworks" J. Am. Chem. Soc., 130 (2008) 12626-12627.
Pal et al., "Characterization of CO2 plasma treated polymeric membranes and quantification of flux enhancement", Journal of Membrane Science, 323: 1-10, (2008).
Pan et al., "Effective separation of propylene/propane binary mixtures by ZIF-8 membranes", Journal of Membrane Science 390-391 (2012) 93-98.
Pan et al., "Synthesis of ceramic hollow fiber supported zeolitic imidazolate framework-8 (ZIF-8) membranes with high hydrogen permeability", Journal of Membrane Science 421-422 (2012) 292-298.
Park et al., "Exceptional chemical and thermal stability of zeolitic imidazolate frameworks", PNAS 103 (2006) 10186-10191.
Perry "Perry's Chemical Engineers Handbook" 1999 McGraw-Hill, p. 22-38.
Rosi, et al., "Rod packings and metal-organic frameworks constructed from rod-shaped secondary building units", J Am Chem Soc., 2005, 127(5):1504-18.
Search Report and Written Opinion issued in PCT/US2014/019979, dated Jun. 4, 2014.
Shao et al., "Effect of Plasma Treatment on the Gas Permeability of Poly(4-methyl-2-pentyne) Membranes", Plasma Processes and Polymers, 4: 823-831, 2007.
Thompson et al., "Hybrid Zeolitic Imidazolate Frameworks: Controlling Framework Porosity and Functionality by Mixed-Linker Synthesis", Chem. Mater., 24: 1930, (2012).
Vankelecom, I. F. J. et al. "Incorporation of Zeolites in Polyimide Membranes." Journal of Physical Chemistry. vol. 99, Issue 35, pp. 13187-13192. 1995.
Venna, et al., "Highly permeable zeolite imidazolate framework-8 membranes for CO2/CH4 separation", J Am Chem Soc., 2010, 132:76-78.
Wang & Cohen, "Postsynthetic modification of metal-organic frameworks", Chem Soc Rev. 2009, 38(5):1315-29.
Wavhal "Membrane surface modification by plasma-induced polymerization of acrylamide for improved surface properties and reduced protein fouling", Langmuir, 19: 79-85, 2003.
Wijenayake, Sumudu N. et al., "Surface Cross-Linking of ZIF-8/Polyimide Mixed Matrix Membranes (MMMs) for Gas Separation", Apr. 2013, Ind. Eng. Chem. Res., 52: 6991-7001.
Yamaguchi et al., "Plasma-graft filling polymerization preparation of a new type of pervaporation membrane for organic liquid mixtures", Macromolecules, 24: 5522-5527, 1991.
Yu et al., "Surface modification of polypropylene microporous membrane to improve its antifouling property in MBR: CO2 plasma treatment", Journal of Membrane Science 254:219-227, 2005.
Zhang "Synthesis and properties of novel soluble polyimides having a spirobisindane-linked dianhydride unit" Polymer 2007, 48: 2250-2256.
Zhang et al., "High performance ZIF-8/6FDA-DAM mixed matrix membrane for propylene/propane separations", Journal of Membrane Science 389: 34-42, (2012).

* cited by examiner

UV AND THERMALLY TREATED POLYMERIC MEMBRANES

CROSS REFERENCE TO RELATED APPLICATIONS

This application is a national phase application under 35 U.S.C. §371 of International Application No PCT/US2014/070322, filed Dec. 15, 2014, which claims the benefit to U.S. Provisional Patent Application No. 61/916,602 titled "UV AND THERMALLY TREATED POLYMERIC MEMBRANES" filed Dec. 16, 2013. The entire contents of each of the above-referenced disclosures are specifically incorporated herein by reference without disclaimer.

BACKGROUND OF THE INVENTION

A. Field of the Invention

The present invention relates to polymeric membranes that have been treated with ultra-violet (UV) radiation and thermal treatment. The membranes have improved permeability and selectivity parameters for gas, vapor, and liquid separation applications. In particular embodiments, the treated membranes are particularly useful for C2 or C3 olefin/paraffin separation applications.

B. Description of Related Art

A membrane is a structure that has the ability to separate one or more materials from a liquid, vapor or gas. It acts like a selective barrier by allowing some material to pass through (i.e., the permeate or permeate stream) while preventing others from passing through (i.e., the retentate or retentate stream). This separation property has wide applicability in both the laboratory and industrial settings in instances where it is desired to separate materials from one another (e.g., removal of nitrogen or oxygen from air, separation of hydrogen from gases like nitrogen and methane, recovery of hydrogen from product streams of ammonia plants, recovery of hydrogen in oil refinery processes, separation of methane from the other components of biogas, enrichment of air by oxygen for medical or metallurgical purposes, enrichment of ullage or headspace by nitrogen in inerting systems designed to prevent fuel tank explosions, removal of water vapor from natural gas and other gases, removal of carbon dioxide from natural gas, removal of $H_2S$ from natural gas, removal of volatile organic liquids (VOL) from air of exhaust streams, desiccation or dehumidification of air, etc.).

Examples of membranes include polymeric membranes such as those made from polymers, liquid membranes (e.g., emulsion liquid membranes, immobilized (supported) liquid membranes, molten salts, etc.), and ceramic membranes made from inorganic materials such as alumina, titanium dioxide, zirconia oxides, glassy materials, etc.

For gas separation applications, the membrane of choice is typically a polymeric membrane. One of the issues facing polymeric membranes, however, is their well-known trade-off between permeability and selectivity as illustrated by Robeson's upper bound curves (see L. M. Robeson, Correlation of separation factor versus permeability for polymeric membranes, J. Membr. Sci., 62 (1991) 165). In particular, there is an upper bound for selectivity of, for example, one gas over another, such that the selectivity decreases linearly with an increase in membrane permeability. Both high permeability and high selectivity are desirable attributes, however. The higher permeability equates to a decrease in the size of the membrane area required to treat a given volume of gas. This leads to a decrease in the cost of the membrane units. As for higher selectivity, it can result in a process that produces a more pure gas product.

A majority of the polymeric membranes that are currently used in the industry fail to perform above a given Robeson's upper bound trade-off curve. That is, a majority of such membranes fail to surpass the permeability-selectivity trade-off limitations, thereby making them less efficient and more costly to use. As a result, additional processing steps may be required to obtain the level of gas separation or purity level desired for a given gas.

SUMMARY OF THE INVENTION

A solution to the disadvantages of the currently available membranes has now been discovered. The solution is based on a surprising discovery that the selectivity of a polymeric membrane having a blend of at least a first and second polymer selected from a polymer of intrinsic microporosity (PIM), a polyetherimide (PEI) polymer, a polyimide (PI) polymer, or a polyetherimide-siloxane (PEI-Si) polymer can be dramatically improved by subjecting said membrane to UV treatment and thermal treatment. For instance, membranes of the present invention exhibit a selectivity of C2 olefins to paraffins that exceeds the Robeson's upper bound trade-off curve. Without wishing to be bound by theory, it is believed that such treatments change the interaction of the first and second polymers with one another on a molecular level such that the membranes exhibit an improved selectivity of particular materials (e.g., C2 olefins from C2 paraffins) when compared to similar membranes that have not been UV- and thermally-treated.

In one particular instance, there is disclosed a polymeric membrane that has been UV-treated or thermally-treated or both UV- and thermally-treated. The membrane can include a blend of at least a first polymer and a second polymer selected from a polymer of intrinsic microporosity (PIM), a polyetherimide (PEI) polymer, a polyimide (PI) polymer, or a polyetherimide-siloxane (PEI-Si) polymer. The polymers can be homogenously blended throughout the membrane. In addition to the first and second polymers, the membrane matrix can include at least a third, fourth, fifth, etc. polymer. Alternatively, the membranes can include only one of the aforementioned polymers. In particular instances, the first and second polymers can be different from one another, thereby creating a blend or combination of different polymers that make up the composition. The blend can include at least one, two, three, or all four of said class of polymers. Further, the blend can be from a single class or genus of polymers (e.g., PIM polymer) such that there are at least two different types of PIM polymers in the blend (e.g., PIM-1 and PIM-7 or PIM and PIM-PI) or from a (PEI) polymer such that there at least two different types of PEI polymers in the blend (e.g., Ultem® and Extern® or Ultem® and Ultem® 1010), or from a PI polymer such that there are at least two different types of PI polymers in the blend, or a PEI-Si polymer such that there are two different types of PEI-Si polymers in the blend. In particular instances, the blend can include polymers from different classes (e.g., a PIM polymer with a PEI polymer, a PIM polymer with a PI polymer, a PIM polymer with a PEI-Si polymer, PEI polymer with a PI polymer, a PEI polymer with a PEI-Si polymer, or a PI polymer with a PEI-Si polymer). In one particular embodiment, blend can be a (PIM) polymer such as PIM-1 with a PEI polymer (e.g., Ultem® and Extern® or Ultem® and Ultem® 1010) and the polymeric membrane can be designed such that it is capable of separating a first gas from a second gas, wherein both gases are comprised within a mixture. In a preferred aspect, the polymeric membrane can include a PIM polymer and a PEI polymer and can be capable of separating C2 or C3 olefins from C2 or C3 paraffins. Such polymeric membranes can have a selectivity of $C_2H_4$ to $C2\,H_6$ or a selectivity of $C_3H_6$ to $C_3H_8$ that exceeds the Robeson's upper bound trade-off curve at a temperature of 25° C. and a feed pressure of 2 atm. The membranes can be UV-treated with UV radiation for 30 to 300 minutes or from 60 to 300 minutes or from 90 to 240 minutes or from 120 to 240 minutes. The membranes can also be thermally-treated at a temperature of 100 to 400° C. or from 200 to 350° C. or from 250 to 350° C. for 12 to 96 hours or 24 to 96 hours or 36 to 96 hours. The UV- and thermal-treatments can be simultaneous, overlap one another, or can be such that the UV-treatment is first and thermal-treatment is second or thermal-treatment is first and UV-treatment is second. In some aspects, the amount of the polymers in the membrane can be such that said membranes include 5 to 95% by weight of the first polymer and from 95 to 5% by weight of the second polymer or any range therein (e.g., the membranes can include at least 5, 10, 15, 20, 25, 30, 35, 40, 45, 50, 55, 60, 65, 70, 75, 80, 85, or 95% by weight of the first or second polymers). In more particular aspects, the amounts can range such that said membranes include from 80 to 95% w/w of the first polymer (e.g., PIM polymer such as PIM-1) and from 5 to 20% w/w of the second polymer (e.g., PEI polymer). The membranes can be flat sheet membranes, spiral membranes, tubular membranes, or hollow fiber membranes. In some instances, the membranes can have a uniform density, can be symmetric membranes, asymmetric membranes, composite membranes, or single layer membranes. The membranes can also include an additive (e.g., a covalent organic framework (COF) additive, a metal-organic framework (MOF) additive, a carbon nanotube (CNT) additive, fumed silica (FS), titanium dioxide ($TiO_2$) or graphene).

Also disclosed are processes of using the polymeric membranes disclosed throughout this specification. In one instance, the process can be used to separate two materials, gases, liquids, compounds, etc. from one another. Such a process can include contacting a mixture or composition having the materials to be separated on a first side of the composition or membrane, such that at least a first material is retained on the first side in the form of a retentate and at least a second gas is permeated through the composition or membrane to a second side in the form of a permeate. In this sense, the composition or method could include opposing sides, wherein one side is the retentate side and the opposing side is the permeate side. The feed pressure of the mixture to the membrane or the pressure at which the mixture is fed to the membrane can be 1, 2, 3, 4, 5, 6, 7, 8, 9, 10, 11, 12, 13, 14, 15, 16, 17, 18, 19 or 20 atm or more or can range from 1 to 20 atm, 2 to 15 atm, or from 2 to 10 atm. Further the temperature during the separation step can be 20, 25, 30, 35, 40, 45, 50, 55, 60, or 65° C. or more or can range from 20 to 65° C. or from 25 to 65° C. or from 20to 30° C. The process can further include removing or isolating the either or both of the retentate and/or the permeate from the composition or membrane. The retentate and/or the permeate can be subjected to further processing steps such as a further purification step (e.g., column chromatography, additional membrane separation steps, etc.). In particular instances, the process can be directed to removing at least one of $N_2$, $H_2$, $CH_4$, $CO_2$, $C_2H_4$, $C_2H_6$, $C_3H_6$, and/or $C_3H_8$ from a mixture. Examples of processes that the compositions and membranes of the present invention can be used in include gas separation (GS) processes, vapor permeation (VP) processes, pervaporation (PV) processes, membrane distillation (MD) processes, membrane contactors (MC) processes, and carrier mediated processes, sorbent PSA (pressure swing absorption), etc. Further, it is contemplated that at least 2, 3, 4, 5, or more of the same or different membranes of the present invention can be used in series with one another to further purify or isolate a targeted liquid, vapour, or gas material. Similarly, the membranes of the present invention can be used in series with other currently known membranes to purify or isolate a targeted material.

In another aspect, there is disclosed a method of making a polymeric membrane of the present invention such as by treating a surface of a polymeric membrane that has a blend of at least a first polymer and a second polymer, wherein the first and second polymers are each selected from a polymer of intrinsic microporosity (PIM), a polyetherimide (PEI) polymer, a polyimide (PI) polymer, or a polyetherimide-siloxane (PEI-Si) polymer; and subjecting at least a portion of the surface of the polymeric membrane to ultraviolet radiation and thermal treatment. Particular membranes and UV- and thermal-treatment parameters that can be used as those discussed above and throughout the specification. The method can further include making the polymeric membranes by obtaining a mixture comprising at least the aforementioned first polymer and second polymer, depositing the mixture onto a substrate and drying the mixture to form a membrane. The formed membrane can then be treated with UV radiation and/or thermal treatment. The mixture can be a solution such that the first and second polymers are partially or fully solubilized within the solution or the mixture can be a dispersion such that the first and second polymers are dispersed in said mixture. The resulting membranes can be such that the polymers are homogenously blended throughout the membrane. Drying of the mixture can be performed, for example, by vacuum drying or heat drying or both.

Also disclosed is a gas separation device comprising any one of the polymeric membranes of the present invention. The gas separation device can include an inlet configured to accept feed material, a first outlet configured to expel a retentate, and a second outlet configured to expel a permeate. The device can be configured to be pressurized so as to push feed material through the inlet, retentate through the first outlet, and permeate through the second outlet. The device can be configured to house and utilize flat sheet membranes, spiral membranes, tubular membranes, or hollow fiber membranes of the present invention.

"Inhibiting" or "reducing" or any variation of these terms, when used in the claims or the specification includes any measurable decrease or complete inhibition to achieve a desired result.

"Effective" or "treating" or "preventing" or any variation of these terms, when used in the claims or specification, means adequate to accomplish a desired, expected, or intended result.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods, ingredients, components, compositions, etc. of the present invention can "comprise," "consist essentially of," or "consist of" particular method steps, ingredients, components, compositions, etc. disclosed throughout the specification. With respect to the transitional phase "consisting essentially of," in one non-limiting aspect, a basic and novel characteristic of the membranes of the present invention are their permeability and selectivity parameters.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Figure 1:
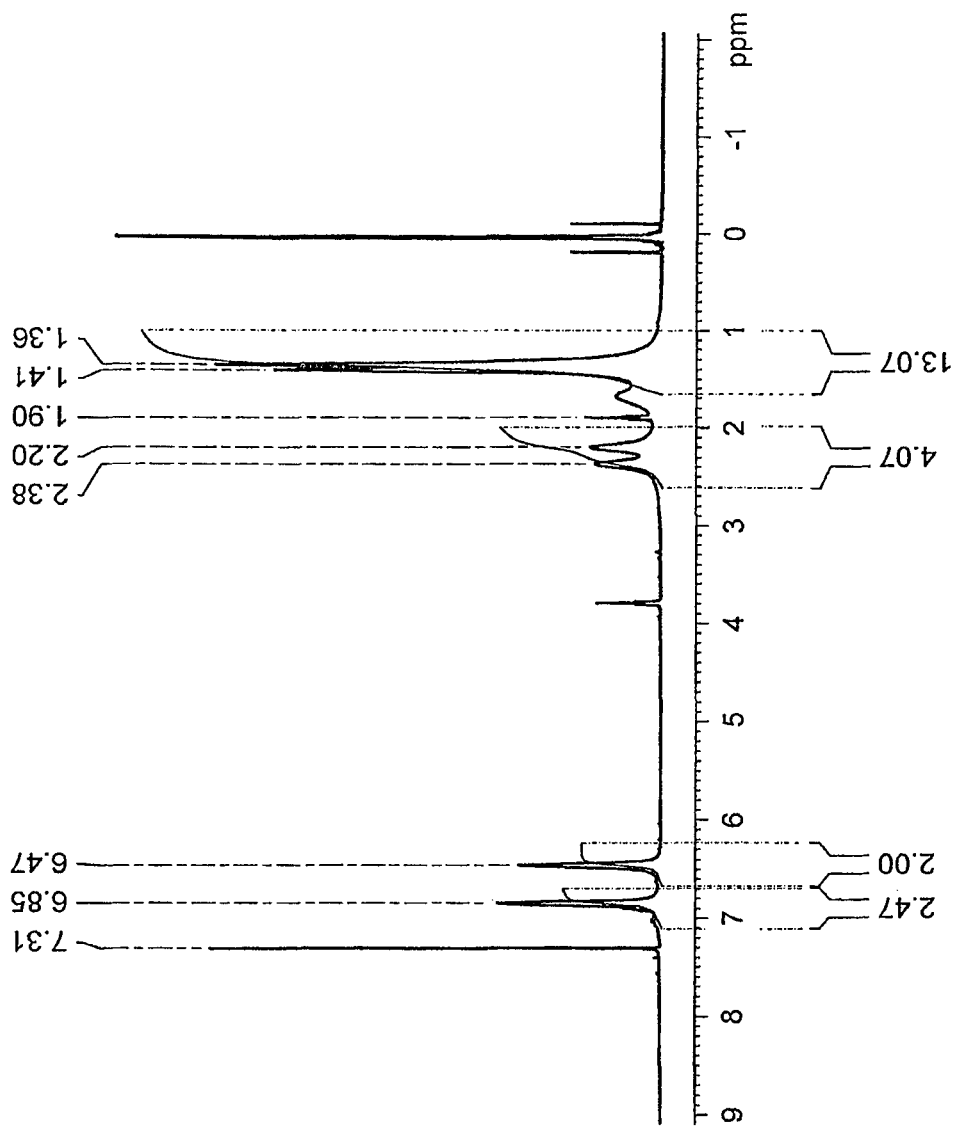
FIG. 1: Nuclear Magnetic Resonance (NMR) spectrum of PIM-1.

Current polymeric membrane materials do not have sufficient permeability/selectivity properties. This leads to inefficiencies in separating techniques and increased costs associated with such techniques.

It has now been discovered that UV- and thermally-treated polymeric membranes having a blend of particular polymers have improved permeability and selectivity parameters that are currently lacking in today's available membranes. These discovered membranes can be used across a wide range of processes such as gas separation (GS) processes, vapour permeation (VP) processes, pervaporation (PV) processes, membrane distillation (MD) processes, membrane contactors (MC) processes, and carrier mediated processes. In particular instances, such treated membranes of the present invention have been shown to exhibit an improved selectivity of olefins from paraffins (e.g., C2 or C3 olefins/paraffins) when compared to similar membranes that have not been UV- and thermally-treated.

These and other non-limiting aspects of the present invention are discussed in the following subsections.

A. Polymers

Non-limiting examples of polymers that can be used in the context of the present invention include polymers of intrinsic microporosity (PIMs), polyetherimide (PEI) polymers, polyetherimide-siloxane (PEI-Si) polymers, and polyimide (PI) polymers. As noted above, the compositions and membranes can include a blend of any one of these polymers (including blends of a single class of polymers and blends of different classes of polymers).

1. Polymers of Intrinsic Microporosity

PIMs are typically characterized as having repeat units of dibenzodioxane-based ladder-type structures combined with sites of contortion, which may be those having spiro-centers or severe steric hindrance. The structures of PIMs prevent dense chain packing, causing considerably large accessible surface areas and high gas permeability. The structure of PIM-1, which was used in the Examples, is provided below:

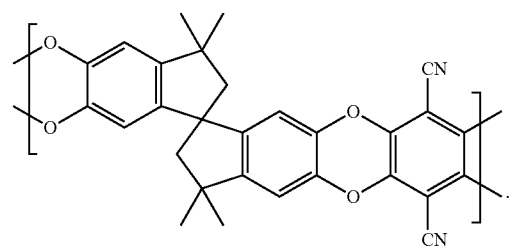

The molecular weight of said polymers can be varied as desired by increasing or decreasing the length of said polymers. PIM-1 can be synthesized as follows:

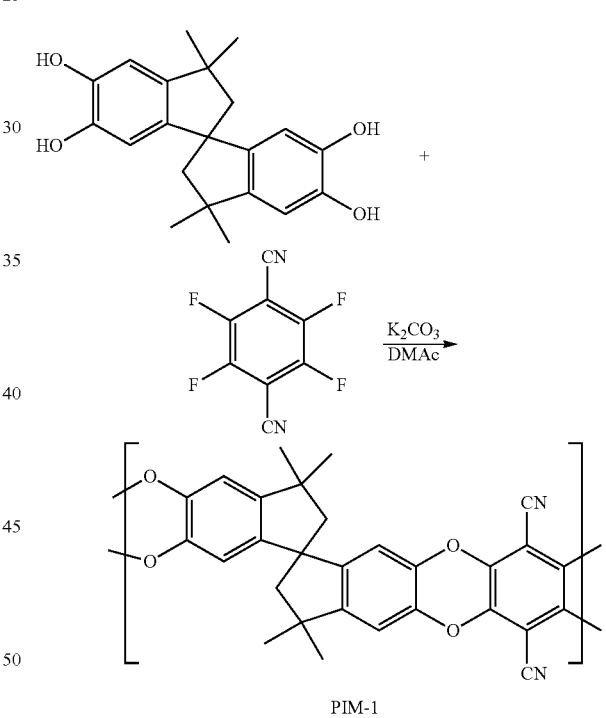

PIM-1

Additional PIMs that can be used in the context of the present invention have the following repeating units:

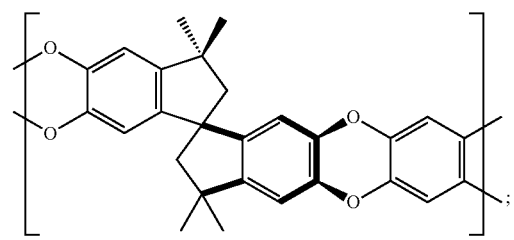

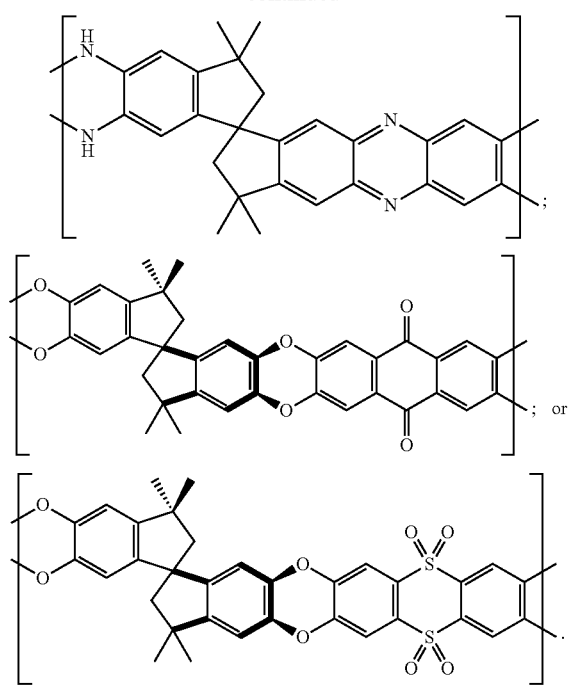
In some instances, the PIM polymers can be prepared using the following reaction scheme:
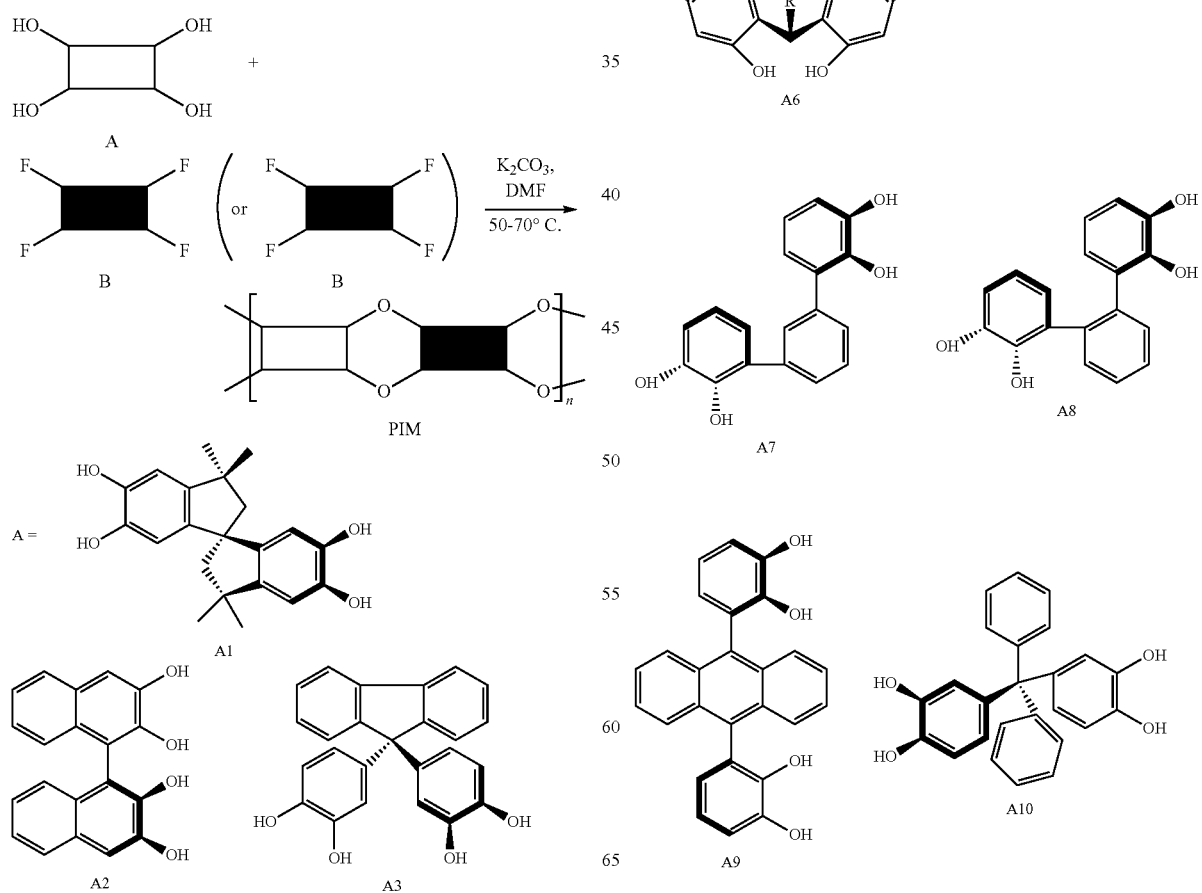
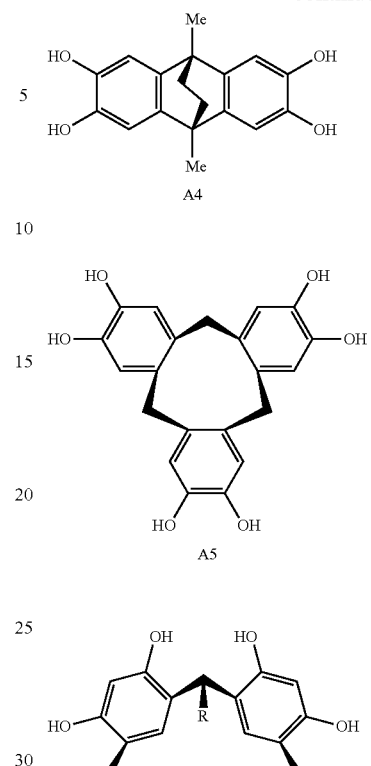

-continued

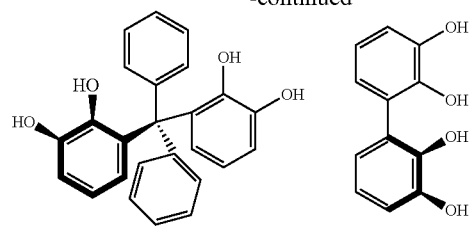

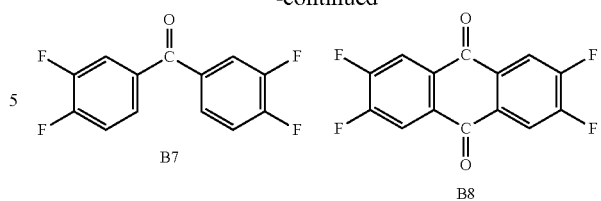

B =

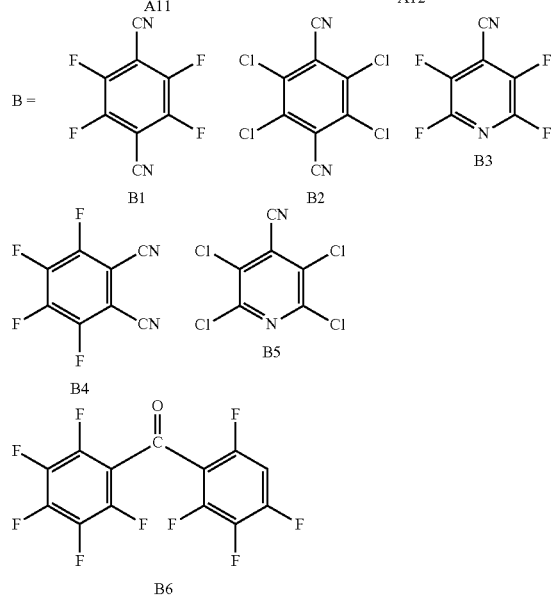

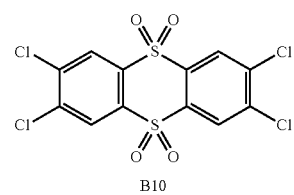

The above structures can further be substituted as desired.

An additional set of PIM polymers that can be used with the blended polymeric membranes of the present invention include the PIM-PI set of polymers disclosed in Ghanem et. al., High-Performance Membranes from Polyimides with Intrinsic Microporosity, *Adv. Mater.* 2008, 20, 2766-2771, which is incorporated by reference. The structures of these PIM-PI polymers are:

PIM-PI-1

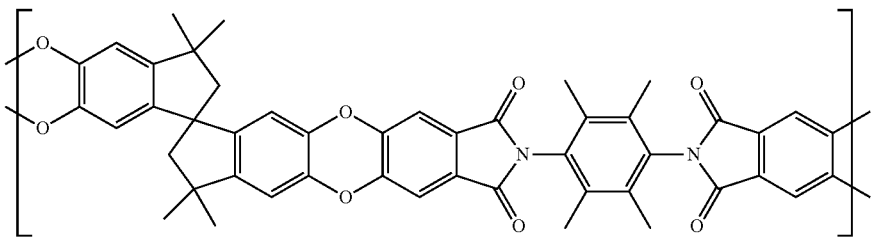

PIM-PI-2

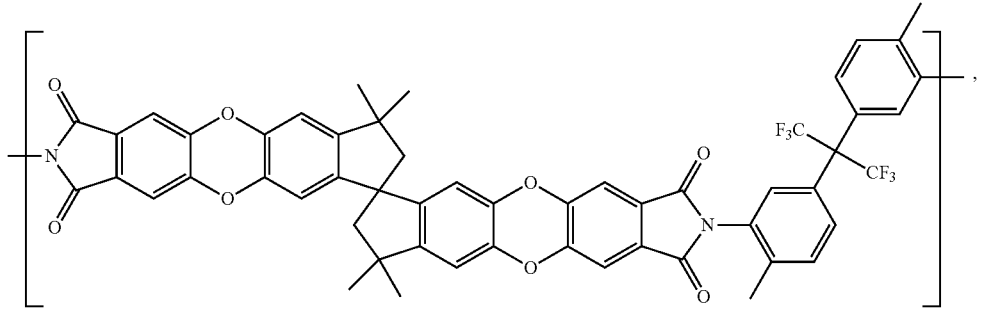

PIM-PI-3

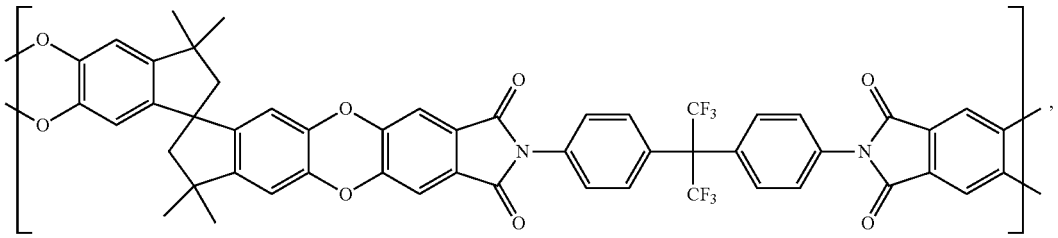

-continued

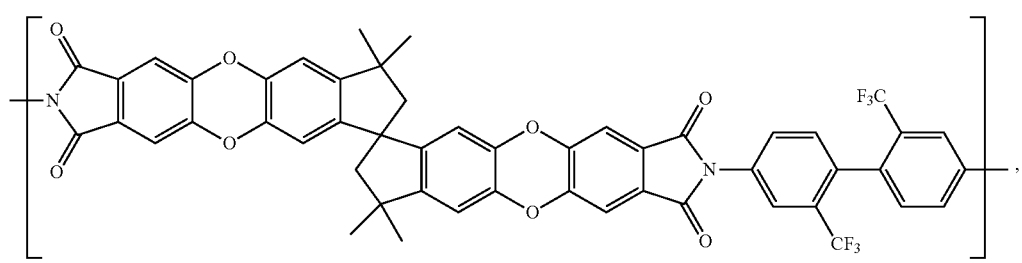
PIM-PI-4

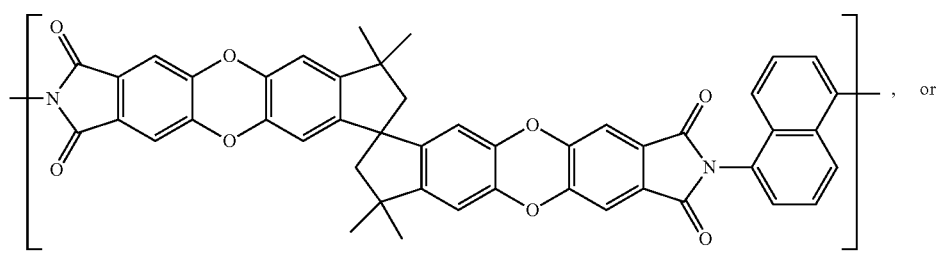
PIM-PI-7, or

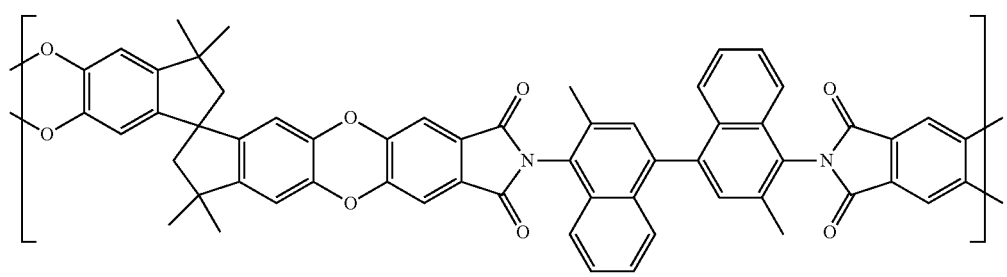
PIM-PI-8

Additional PIMs and examples of how to make and use such PIMs are provided in U.S. Pat. No. 7,758,751 and U.S. Publication 2012/0264589, both of which are incorporated by reference.

2. Polyetherimide and Polyetherimide-Siloxane Polymers

Polyetherimide polymers that can be used in the context of the present invention generally conform to the following monomeric repeating structure:

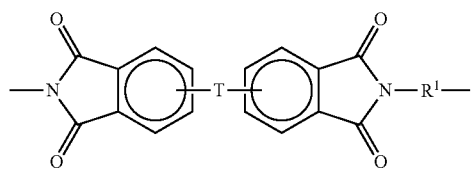

where T and $R^1$ can be varied to create a wide range of usable PEI polymers. $R^1$ can include substituted or unsubstituted divalent organic groups such as: (a) aromatic hydrocarbon groups having 6 to 24 carbon atoms and halogenated derivatives thereof; (b) straight or branched chain alkylene groups having 2 to 20 carbon atoms; (c) cycloalkylene groups having 3 to 24 carbon atoms, or (d) divalent groups of formula (2) defined below. T can be —O— or a group of the formula —O—Z—O— wherein the divalent bonds of the —O— or the —O—Z—O— group are in the 3,3', 3,4', 4,3', or the 4,4' positions. Z can include substituted or unsubstituted divalent organic groups such as: (a) aromatic hydrocarbon groups having about 6 to about 20 carbon atoms and halogenated derivatives thereof; (b) straight or branched chain alkylene groups having about 2 to about 20 carbon atoms; (c) cycloalkylene groups having about 3 to about 20 carbon atoms, or (d) divalent groups of the general formula (2);

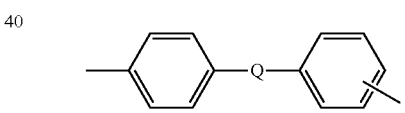

wherein Q can be a divalent moiety selected from the group consisting of —O—, —S—, —C(O)—, —SO$_2$—, —SO—, —C$_y$H$_{2y}$— (y being an integer from 1 to 8), and fluorinated derivatives thereof, including perfluoroalkylene groups. Z may comprise exemplary divalent groups of formula (3)

(3)

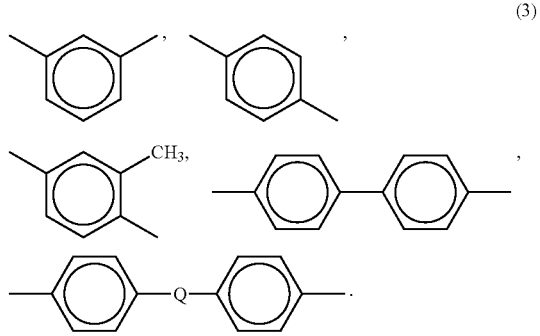

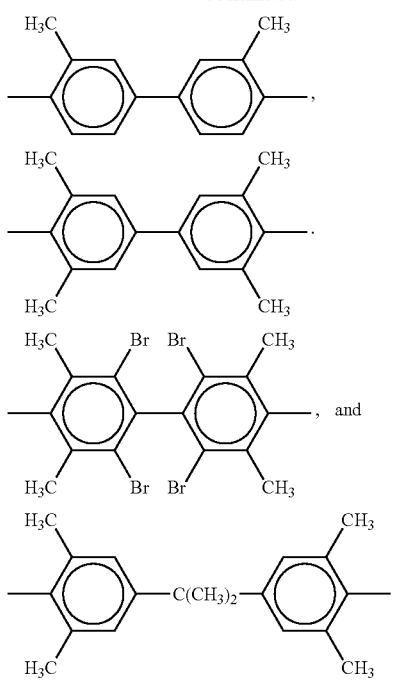

In particular instances, $R^1$ can be as defined in U.S. Pat. No. 8,034,857, which is incorporated into the present application by reference.

Non-limiting examples of specific PEIs that can be used (and that were used in the Examples) include those commercially available from SABIC Innovative Plastics Holding BV (e.g., Ultem® and Extem®). All various grades of Extem® and Ultem® are contemplated as being useful in the context of the present invention (e.g., Extem® (VH1003), Extem® (XH1005), and Extem® (XH1015)).

Polyetherimide siloxane (PEI-Si) polymers can be also used in the context of the present invention. Examples of polyetherimide siloxane polymers are described in U.S. Pat. No. 5,095,060, which is incorporated by reference. A non-limiting example of a specific PEI-Si that can be used include those commercially available from SABIC Innovative Plastics Holding BV (e.g., Siltem®). All various grades of Siltem® are contemplated as being useful in the context of the present invention (e.g., Siltem® (1700) and Siltem® (1500)).

3. Polyimide Polymers

Polyimide (PI) polymers are polymers of imide monomers. The general monomeric structure of an imide is:

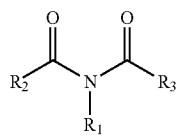

Polymers of imides generally take one of two forms: heterocyclic and linear forms. The structures of each are:

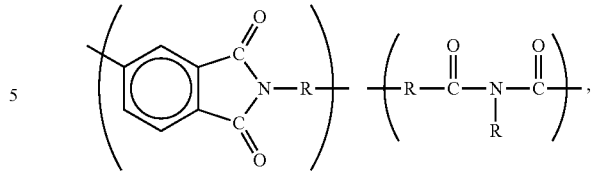

where R can be varied to create a wide range of usable PI polymers. A non-limiting example of a specific PI (i.e., 6FDA-Durene) that can be used is described in the following reaction scheme:

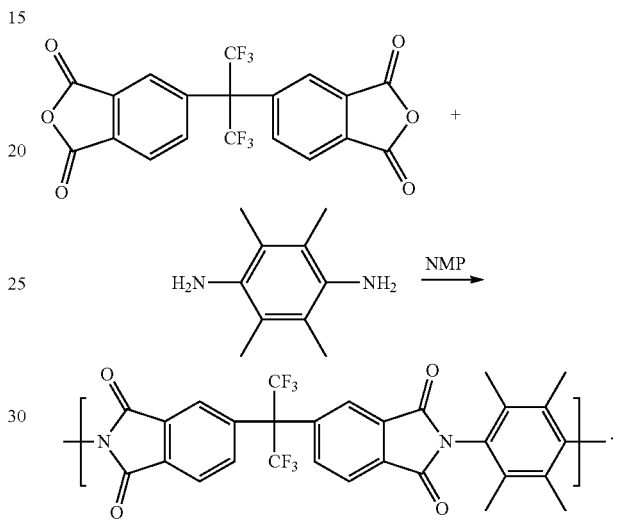

Additional PI polymers that can be used in the context of the present invention are described in U.S. Publication 2012/0276300, which is incorporated by reference. For instance, such PI polymers include both UV crosslinkable functional groups and pendent hydroxy functional groups: poly[3,3',4,4'-benzophenonetetracarboxylic dianhydride-2,2-bis(3-amino-4-hydroxyphenyl)-hexafluoropropane] (poly (BTDA-APAF)), poly[4,4'-oxydiphthalic anhydride-2,2-bis (3-amino-4-hydroxyphenyl)-hexafluoropropane] (poly (ODPA-APAF)), poly(3,3',4,4'-benzophenonetetracarboxylic dianhydride-3,3'-dihydroxy-4,4'-diamino-biphenyl) (poly(BTDA-HAB)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly (DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly [4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxyic dianhydride-2,2-bis(3-amino-4-hydroxyphenyl)-hexafluoropropane-3,3'-dihydroxy-4,4'-diamino-biphenyl] (poly(BTDA-APAF-HAB)), and poly(4,4'-bisphenol A dianhydride-3,3',4,4'-benzophenonetetracarboxylic dianhydride-2,2-bis(3-amino-4-hydroxyphenyl) -hexafluoropropane] (poly(BPADA-BTDA-APAF)). More generically, the PI polymers can have the following formula (I):

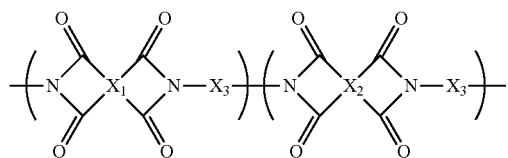
(I)

where the length of the polymer or "n" is typically greater than 1 or greater than 5 and typically from 10 to 10,000 or from 10 to 1000 or from 10 to 500, where —$X_1$— of said formula (I) is

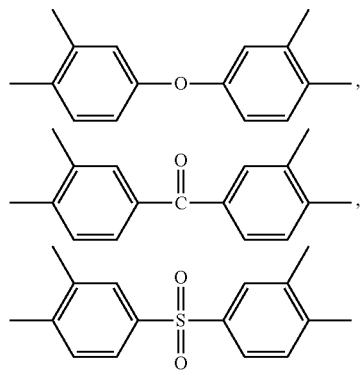

or mixtures thereof, —$X_2$— of said formula (I) is either the same as —$X_1$— or is selected from

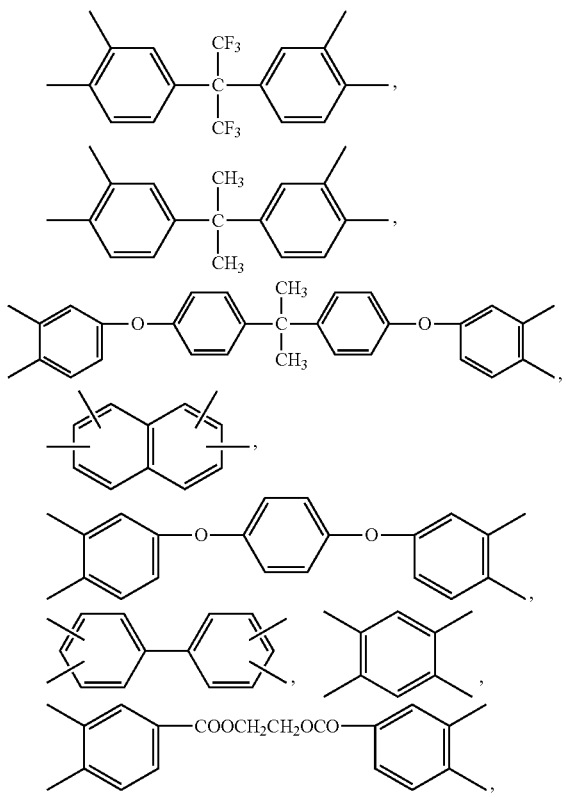

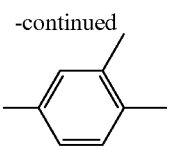

or mixtures thereof, —$X_3$— of said formula (I) is

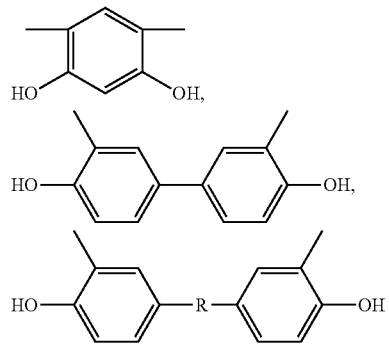

or mixtures thereof, —R— is

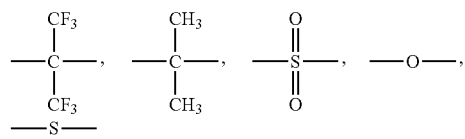

or mixtures thereof.

B. Method of Making Membranes

There are many known methods for making polymeric membranes. Such methods that can be used include air casting (i.e., the dissolved polymer solution passes under a series of air flow ducts that control the evaporation of the solvents in a particular set period of time such as 24 to 48 hours), solvent or emersion casting, (i.e., the dissolved polymer is spread onto a moving belt and run through a bath or liquid in which the liquid within the bath exchanges with the solvent, thereby causing the formation of pores and the thus produced membrane is further dried), and thermal casting (i.e., heat is used to drive the solubility of the polymer in a given solvent system and the heated solution is then cast onto a moving belt and subjected to cooling).

A particular non-limiting process to make the blended polymeric membranes of the present invention is provided below:

(1) At least two different polymers are dissolved in an appropriate solvent (such as chloroform) and poured onto a glass plate.

(2) The poured material/glass plate is placed into a vacuum oven at mild temperature (around 70° C.) for up to 2 days to dry.

(3) Upon drying, the membrane thickness is measured (typically 60-100 um thick when dry).

(4) The dried membrane is then UV-treated and thermally treated. For UV-treatment, such treatment can take place in a UV curing container for a specified amount of time (at a constant height from the light source). For thermal-treatment, such treatment can take place in a thermal treatment furnace at a selected temperature for a selected period of time.

(5) After UV and thermal treatments, the membrane can be tested for single gas permeation for the different gases.

For permeation, testing is based on single gas measurement, in which the system is evacuated. The membrane is then purged with the desired gas three times. The membrane is tested following the purge for up to 8 hours. To test the second gas, the system is evacuated again and purged three times with this second gas. This process is repeated for any additional gasses. The permeation testing is set at a fixed temperature (20-50° C., preferably 25° C.) and pressure (preferably 2 atm). Additional treatments can be performed such as with chemicals, e-beam, gamma radiation, etc.

C. Amounts of Polymers and Additives

The amount of polymer to add to the blend can be varied. For example, the amounts of each of the polymers in the blend can range from 5 to 95% by weight of the membrane. In particular aspects, each polymer can be present within the membrane in amounts from 1, 2, 3, 4, 5, 10, 15, 20, 25, 30, 35, 40, 45, 50, 55, 60, 65, 70, 75, 80, 85, or 95% by weight of the composition or membrane. Further, additives such as covalent organic framework (COF) additives, metal-organic framework (MOF) additives, carbon nanotube (CNT) additives, fumed silica (FS), titanium dioxide ($TiO_2$), graphene, etc. can be added in amounts ranging from 1, 2, 3, 4, 5, 6, 7, 8, 9, 10, 15, 20, 25%, or more by weight of the membrane. Such additives can be added to the blend prior to formation of the membrane.

D. Membrane Applications

The compositions and membranes of the present invention have a wide-range of commercial applications. For instance, and with respect to the petro-chemical and chemical industries, there are numerous petro-chemical/chemical processes that supply pure or enriched gases such as He, $N_2$, and $O_2$, which use membranes to purify or enrich such gases. Further, removal, recapture, and reuse of gases such as $CO_2$ and $H_2S$ from chemical process waste and from natural gas streams is of critical importance for complying with government regulations concerning the production of such gases as well as for environmental factors. Also, efficient separation of olefin and paraffin gases is key in the petrochemical industry. Such olefin/paraffin mixtures can originate from steam cracking units (e.g., ethylene production), catalytic cracking units (e.g., motor gasoline production), or dehydration of paraffins. Membranes of the invention can be used in each of these as well as other applications. For instance, and as illustrated in the Examples, the treated membranes are particularly useful for C2 or C3 olefin/paraffin separation applications.

The membranes of the present invention can be used in the purification, separation or adsorption of a particular species in the liquid or gas phase. In addition to separation of pairs of gases, the membranes can also be used to separate proteins or other thermally unstable compounds. The membranes may also be used in fermenters and bioreactors to transport gases into the reaction vessel and to transfer cell culture medium out of the vessel. Additionally, the membranes can be used to remove microorganisms from air or water streams, water purification, ethanol production in a continuous fermentation/membrane pervaporation system, and/or in detection or removal of trace compounds or metal salts in air or water streams.

In another instance, the membranes can be used in the separation of liquid mixtures by pervaporation, such as in the removal of organic compounds (e.g., alcohols, phenols, chlorinated hydrocarbons, pyridines, ketones) from water such as aqueous effluents or process fluids. By way of example, a membrane that is ethanol-selective could be used to increase the ethanol concentration in relatively dilute ethanol solutions (e.g., less than 10% ethanol or less than 5% ethanol or from 5 to 10% ethanol) obtained by fermentation processes. A further liquid phase separation example that is contemplated with the compositions and membranes of the present invention includes the deep desulfurization of gasoline and diesel fuels by a pervaporation membrane process (see, e.g., U.S. Pat. No. 7,048,846, which is incorporated by reference). Compositions and membranes of the present invention that are selective to sulfur-containing molecules could be used to selectively remove sulfur-containing molecules from fluid catalytic cracking (FCC) and other naphtha-hydrocarbon streams. Further, mixtures of organic compounds that can be separated with the compositions and membranes of the present invention include ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropyl ether-isopropanol, methanol-ethanol-isopropanol, and/or ethylacetate-ethanol-acetic acid.

In particular instances, the membranes of the present invention can be used in gas separation processes in air purification, petrochemical, refinery, natural gas industries. Examples of such separations include separation of volatile organic compounds (such as toluene, xylene, and acetone) from chemical process waste streams and from Flue gas streams. Further examples of such separations include the separation of $CO_2$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the blended polymeric membranes described herein. More than two gases can be removed from a third gas. For example, some of the gas components which can be selectively removed from a raw natural gas using the membranes described herein include carbon dioxide, oxygen, nitrogen, water vapor, hydrogen sulfide, helium, and other trace gases. Some of the gas components that can be selectively retained include hydrocarbon gases. In further instances, the membranes can be used on a mixture of gases that include at least 2, 3, 4, or more gases such that a selected gas or gases pass through the membrane (e.g., permeated gas or a mixture of permeated gases) while the remaining gas or gases do not pass through the membrane (e.g., retained gas or a mixture of retained gases).

Additionally, the membranes of the present invention can be used to separate organic molecules from water (e.g., ethanol and/or phenol from water by pervaporation) and removal of metal (e.g., mercury(II) ion and radioactive cesium(I) ion) and other organic compounds (e.g., benzene and atrazene from water).

A further use of the membranes of the present invention includes their use in chemical reactors to enhance the yield of equilibrium-limited reactions by selective removal of a specific product in an analogous fashion to the use of hydrophilic membranes to enhance esterification yield by the removal of water.

The membranes of the present invention can also be fabricated into any convenient form such as sheets, tubes, spiral, or hollow fibers. They can also be fabricated into thin film composite membranes incorporating a selective thin layer that has been UV- and thermally-treated and a porous supporting layer comprising a different polymer material.

Table 1 includes some particular non-limiting gas separation applications of the present invention.

TABLE 1

| Gas Separation | Application |
| --- | --- |
| $O_2/N_2$ | Nitrogen generation, oxygen enrichment |
| $H_2$/hydrocarbons | Refinery hydrocarbon recovery |
| $H_2/CO$ | Syngas ratio adjustment |
| $H_2/N_2$ | Ammonia purge gas |
| $CO_2$/hydrocarbon | Acid gas treating, enhanced oil recovery, landfill gas upgrading, pollution control |
| $H_2S$/hydrocarbon | Sour gas treating |
| $H_2O$/hydrocarbon | Natural gas dehydration |
| $H_2O$/air | Air dehydration |
| Hydrocarbons/air | Pollution control, hydrocarbon recovery |
| Hydrocarbons from process streams | Organic solvent recovery, monomer recovery |
| Olefin/paraffin | Refinery |

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of PIM-1

3,3,3',3',-tetramethyl-spirobisindan-5,5'6,6'-tetraol (340 mg, 1.00 mmol) and 1,4-dicyanotetrafluorobenzene (200 mg, 1.00 mmol) were dissolved in anhydrous DMAc (2.7 mL), which was stirred at room temperature (i.e., about 20 to 25° C.) for 15 minutes for the totally dissolve of the reagents. Grand $K_2CO_3$ (390 mg, 2.5 mmol) was added in one portion, the reaction system was stirred at room temperature for another half an hour before being heated to 150° C. The viscosity increased in the first 10 minutes, toluene (3.0 ml) was added in one portion, and the system was stirred at 150° C. for another 10 minutes. The resulting mixture was poured into methanol/water=1/1 solvent, the precipitate was filtered and washed with boiling water for three (3) times, and then dissolved in chloroform and precipitated in methanol. A yellow powder (450 mg, 97.8% yield) was obtained after vacuum drying at 120° C. for 12 hours. Mn 100,000, Mw 200,000, PDI=2.0. Characterization: 1H NMR (400 MHz, $CDCl_3$) 6.85 (s, 2H), 6.48 (s, 2H), 2.30 (s, 2H), 2.20 (s, 2H), 1.39 (d, 12H, J=22.8 Hz) (see FIG. 1).

Example 2

Membrane Preparation

A PIM-1, an Extern®, an Ultem®, and five PIM-1/PEI dense membranes were prepared by a solution casting method. For the PIM-1/PEI blended membranes Ultem® 1010 was used as the PEI polymer (i.e., PEI (1010)), which is commercially available from SABIC Innovative Plastics Holding BV. The PEI (1010) polymer was first dissolved in $CH_2Cl_2$ and stirred for 4 hours. Subsequently, PIM-1 from Example 1 was added in the solution and stirred overnight. Each of the membranes were each prepared with a total 2 wt % polymer concentration in $CH_2Cl_2$. For the PIM-1/PEI (1010) membranes, the blend ratio of PIM-1 to PEI (1010) was 80:20 wt % (see Table 2 below and FIGS. 4 and 5). The solution was then filtered by 1 μm PTFE filter and transferred into a stainless steel ring supported by a leveled glass plate at Room temperature (i.e., about 20 to 25° C.). The polymer membranes were formed after most of the solvent had evaporated after 3 days. The resultant membranes were dried at 80° C. under vacuum for at least 24 hours. The membrane thickness was measured by an electronic Mitutoyo 2109F thickness gauge (Mitutoyo Corp., Kanagawa, Japan). The gauge was a non-destructive drop-down type with a resolution of 1 micron. Membranes were scanned at a scaling of 100% (uncompressed tiff-format) and analyzed by Scion Image (Scion Corp., MD, USA) software. The effective area was sketched with the draw-by-hand tool both clockwise and counter-clockwise several times. The thickness recorded is an average value obtained from 8 different points of the membranes. The thicknesses of the casted membranes were about 77±5 μm.

None of the PIM, Extern®, and Ultem® membranes were subjected to UV- and thermal-treatments. UV-treatment of the various PIM-1/PEI (1010) membranes was performed via exposing the membranes to UV-radiation in a XL-1000 UV machine (Spectro Linker™, Spectronics Corporation) at the times noted in Table 2. Thermal-treatment of the various PIM-1/PEI (1010) membranes was performed in a thermal treatment furnace (Furnace CWF12/13, Keison, UK) at the temperatures and times noted in Table 2. For membranes in which UV and thermal treatments were performed, UV treatment was first and followed by thermal-treatment.

Example 3

Masking of Membranes

Figure 2:
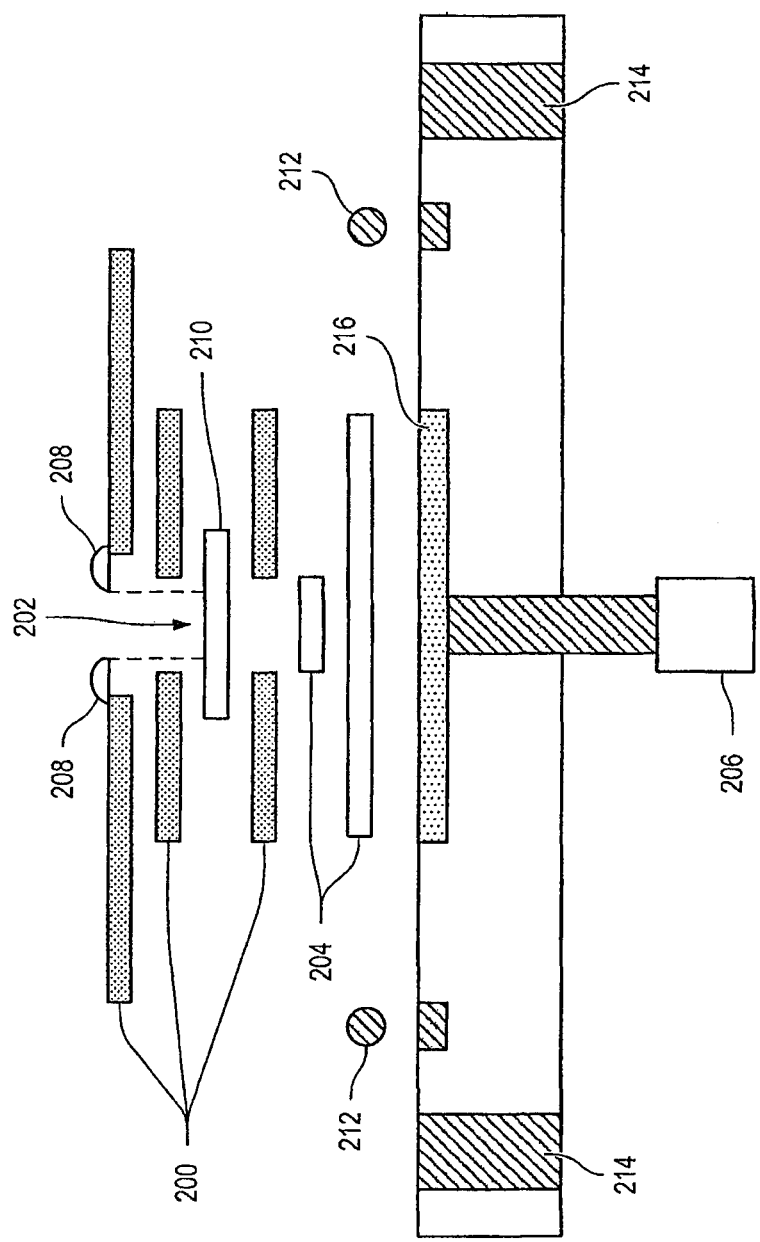
FIG. 2: Cross-section of masking method and lower cell flange.

The membranes 200 were masked using impermeable aluminum tape 202 (3M 7940, see FIG. 2). Filter paper (Schleicher & Schuell BioScience GmbH, Germany) 204 was placed between the metal sinter (Tridelta Siperm GmbH, Germany) 206 of the permeation cell 208 and the masked membrane 200 to protect the membrane mechanically. A smaller piece of filter paper 204 was placed below the effective permeation area 210 of the membrane, offsetting the difference in height and providing support for the membrane. A wider tape 202 was put on top of the membrane/tape sandwich to prevent gas leaks from feed side to permeate side. Epoxy (Devcon®, 2-component 5-Minute Epoxy) 212 was applied at the interface of the tape and membrane also to prevent leaks. [An] O-rings 214 sealed the membrane module from the external environment. No inner O-ring (upper cell flange) was used.

Example 4

Permeability and Selectivity Data

The gas transport properties were measured using the variable pressure (constant volume) method. Ultrahigh-purity gases (99.99%) were used for all experiments. The membrane is mounted in a permeation cell prior to degassing the whole apparatus. Permeant gas is then introduced on the upstream side, and the permeant pressure on the downstream side is monitored using a pressure transducer. From the known steady-state permeation rate, pressure difference across the membrane, permeable area and film thickness, the permeability coefficient is determined (pure gas tests). The permeability coefficient, P [cm³ (STP) ·cm/cm²·s·cmHg], is determined by the following equation:

$$P = \frac{1}{760} \times \frac{V}{A} \times \frac{273}{273+T} \times \frac{L}{760p} \times \frac{dp}{dt}$$

where A is the membrane area (cm²),
L is the membrane thickness (cm),
p is the differential pressure between the upstream and the downstream (MPa),
V is the downstream volume (cm³),
R is the universal gas constant (6236.56 cm³·cmHg/mol·K),
T is the cell temperature (° C.), and
dp/dt is the permeation rate.

The gas permeabilities of polymer membranes are characterized by a mean permeability coefficient with units of Barrer. 1 Barrer=$10^{-10}$ cm³ (STP) ·cm/cm²·s·cmHg. The gas permeability coefficient can be explained on the basis of the solution-diffusion mechanism, which is represented by the following equation:

$$P = D \times S$$

where D (cm²/s) is the diffusion coefficient; and
S (cm³ (STP)/cm³·cmHg) is the solubility coefficient.
The diffusion coefficient was calculated by the time-lag method, represented by the following equation:

$$D = \frac{L^2}{6\theta}$$

where $\theta(s)$ is the time-lag. Once P and D were calculated, the apparent solubility coefficient S (cm³(STP)/cm³·cmHg) may be calculated by the following expression:

$$S = \frac{P}{D}$$

The ideal selectivity of a dense membrane for gas A to gas B is defined as follows:

$$\alpha = \frac{P_A}{P_B} = \frac{D_A}{D_B} * \frac{S_A}{S_B}$$

Figure 3:
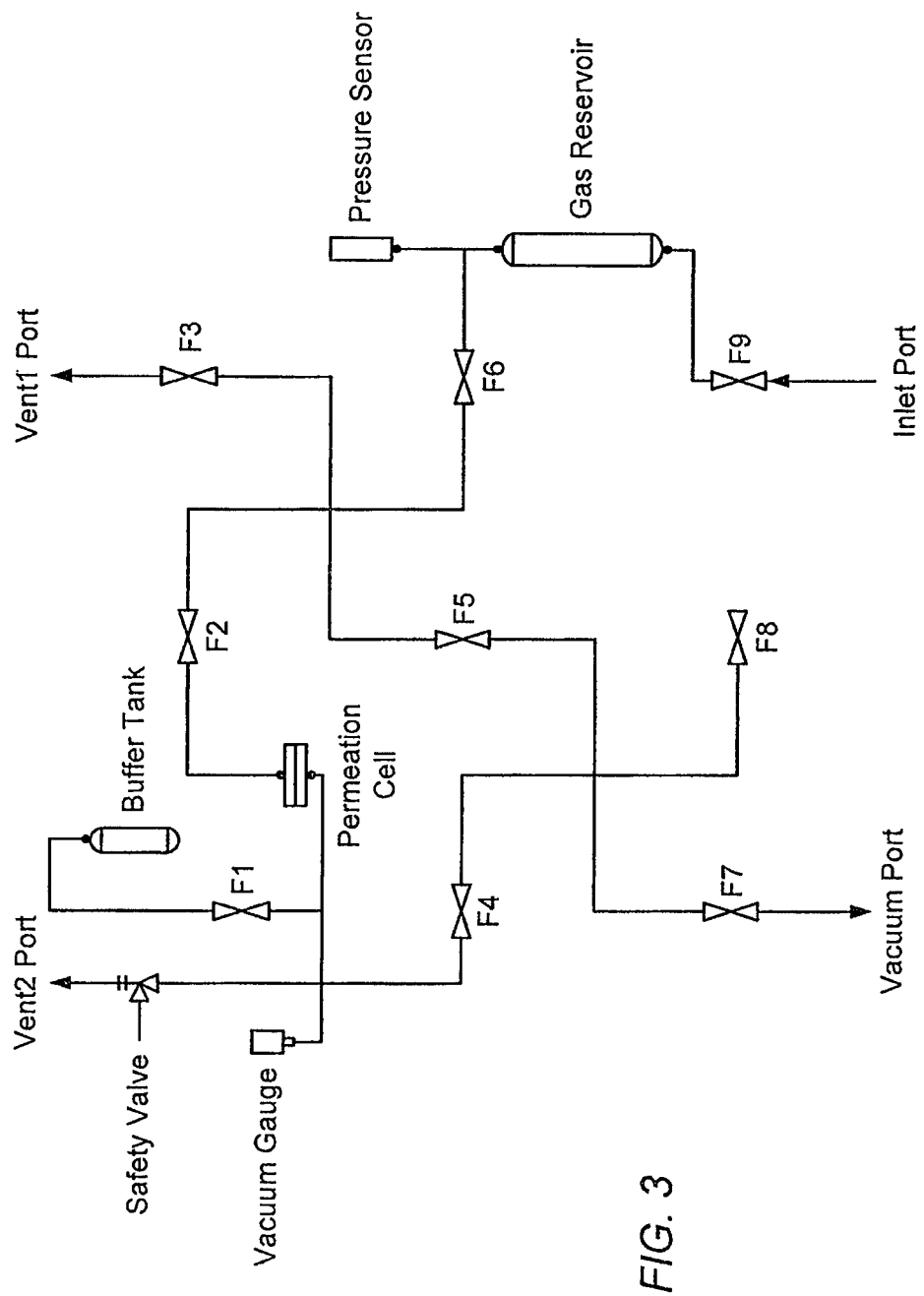
FIG. 3: Flow scheme of the permeability apparatus.

FIG. 3 provides the flow scheme of the permeability apparatus used in procuring the permeability and selectivity data.

Figure 4:
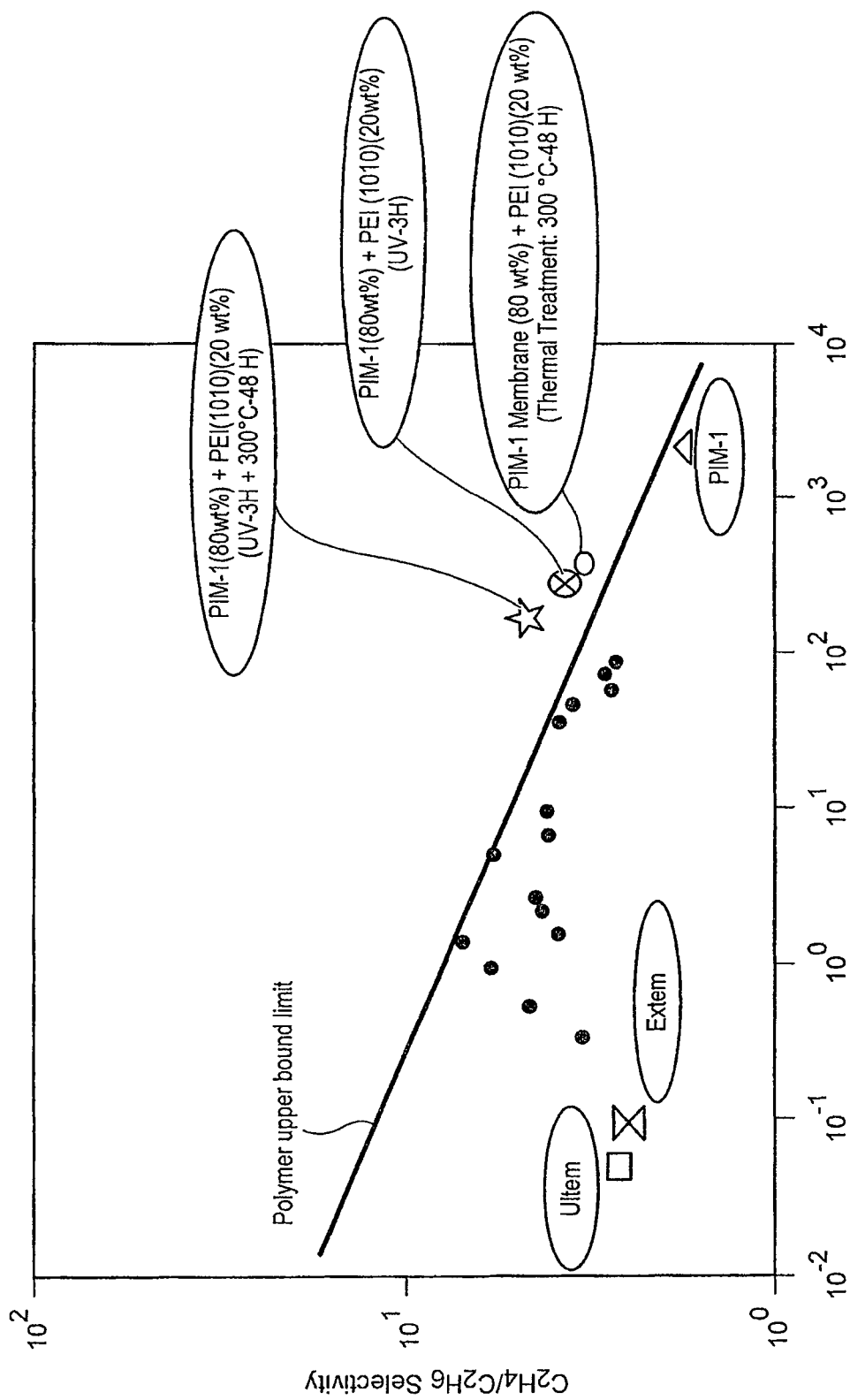
FIG. 4: Gas separation performance for $C_2H_4/C_2H_6$ of various membranes of the present invention.
Figure 5:
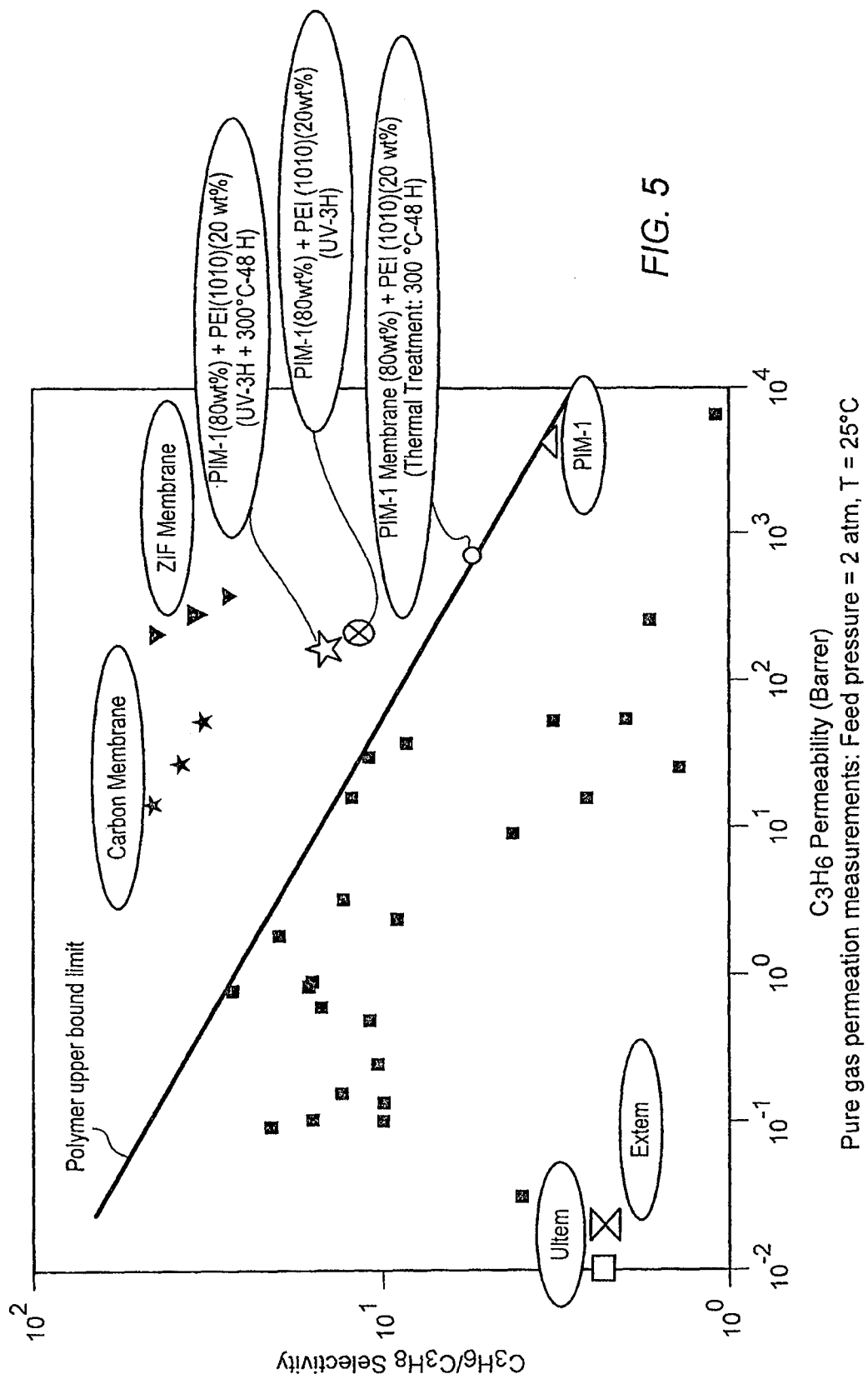
FIG. 5: Gas separation performance for $C_3H_6/C_3H_8$ of various membranes of the present invention.

The permeability and selectivity data procured from various membranes using the above techniques is provided in Table 2. Notably, the PIM-1/PEI (1010) membranes that were treated with a combination of UV- and thermal-treatments exhibited gas separation performance for $C_2H_4/C_2H_6$ and $C_3H_6/C_3H_8$ above the polymer upper bound limit (see FIGS. 4 and 5, respectively). PEI (1010) is Ultem® 1010 and differs from Ultem by molecular weight. FIGS. 4 and 5 represent the selectivity values for $C_2H_4$ over $C_2H_6$ and $C_3H_6$ over $C_3H_8$ as a function of permeability in barrer. Prior literature polymeric membrane permeation data have failed to surpass the upper boundary line (dots below upper boundary line). It is known however that zeolitic and pyrolysis carbon membranes have surpassed such boundary. The data in FIGS. 4 and 5 confirm that the combination of UV- and thermally-treated polymeric membranes have selectivity and permeability values above the upper boundary for polymeric membranes.

TABLE 2

(Permeability Barrier and Ideal Selectivity)

| | Conditions | | | | | | Permeability (Barrer) | |
|---|---|---|---|---|---|---|---|---|
| | UV (h) | Thermal (T, h) | UV and Thermal | T (° C.) | P (atm) | Thickness (µm) | $N_2$ | $H_2$ |
| Ultem | — | — | — | 25 | 2 | 79 | 0.06 | 4.6 |
| Extem | — | — | — | 25 | 2 | 77 | 0.13 | 9.5 |
| PIM-1 | — | — | — | 25 | 2 | 80 | 435 | 4087 |
| PIM-1(80 wt %)-PEI (1010)(20 wt %) | — | — | — | 25 | 2 | 79 | 169 | 1560 |
| PIM-1(80 wt %)-PEI (1010) * (20 wt %) | 1 | — | — | 25 | 2 | 76 | 167 | 1607 |
| PIM-1(80 wt %)-PEI (1010) * (20 wt %) | 3 | — | — | 25 | 2 | 80 | 71 | 1071 |
| PIM-1(80 wt %)-PEI (1010) * (20 wt %) | — | 300° C., 48 h | — | 25 | 2 | 78 | 115 | 1380 |
| PIM-1(80 wt %)-PEI (1010) * (20 wt %) | — | — | UV-3 h and 300° C.-48 h | 25 | 2 | 80 | 52 | 1062 |

| | Permeability (Barrer) | | | | | |
|---|---|---|---|---|---|---|
| | $CH_4$ | $CO_2$ | $C_2H_4$ | $C_2H_6$ | $C_3H_6$ | $C_3H_8$ |
| Ultem | 0.059 | 1.45 | 0.045 | 0.017 | 0.009 | 0.004 |
| Extem | 0.15 | 3.21 | 0.086 | 0.034 | 0.018 | 0.008 |
| PIM-1 | 583 | 6090 | 2003 | 1202 | 4290 | 1281 |
| PIM-1(80 wt %)-PEI (1010)(20 wt %) | 274 | 3356 | 570 | 221 | 1996 | 488 |
| PIM-1(80 wt %)-PEI (1010) * (20 wt %) | 200 | 2403 | 410 | 163 | 1663 | 198 |

TABLE 2-continued

| (Permeability Barrier and Ideal Selectivity) | | | | | | |
|---|---|---|---|---|---|---|
| PIM-1(80 wt %)-PEI (1010) * (20 wt %) | 121 | 1650 | 210 | 56 | 246 | 22 |
| PIM-1(80 wt %)-PEI (1010) * (20 wt %) | 134 | 1780 | 278 | 78 | 492 | 87 |
| PIM-1(80 wt %)-PEI (1010) * (20 wt %) | 48 | 1298 | 136 | 28 | 211 | 16 |

| | Ideal Selectivity | | | | | | | | |
|---|---|---|---|---|---|---|---|---|---|
| | $H_2/N_2$ | $CO_2/N_2$ | $CO_2/CH_4$ | $H_2/CH_4$ | $CO_2/C_2H_4$ | $C_2H_4/C_2H_6$ | $C_3H_6/C_3H_8$ | $CO_2/C_2H_6$ | $H_2/C_2H_4$ | $H_2/C_3H_6$ |
| Ultem | 74.2 | 23.4 | 24.6 | 78.0 | 32.2 | 2.6 | 2.3 | 85.3 | 102.2 | 511.1 |
| Extem | 73.1 | 24.7 | 21.4 | 63.3 | 37.3 | 2.5 | 2.3 | 94.4 | 110.5 | 527.8 |
| PIM-1 | 9.4 | 14.0 | 10.4 | 7.0 | 3.0 | 1.7 | 3.3 | 5.1 | 2.0 | 1.0 |
| PIM-1(80 wt %)-PEI (1010)(20 wt %) | 9.2 | 19.9 | 12.2 | 5.7 | 5.9 | 2.6 | 4.1 | 15.2 | 2.7 | 0.8 |
| PIM-1(80 wt %)-PEI (1010) (20 wt %) | 9.6 | 14.4 | 12.0 | 8.0 | 5.9 | 2.5 | 8.4 | 14.7 | 3.9 | 1.0 |
| PIM-1(80 wt %)-PEI (1010) (20 wt %) | 15.1 | 23.2 | 13.6 | 8.9 | 7.9 | 3.8 | 11.2 | 29.5 | 5.1 | 4.4 |
| PIM-1(80 wt %)-PEI (1010) (20 wt %) | 12.0 | 15.5 | 13.3 | 10.3 | 6.4 | 3.6 | 5.7 | 22.8 | 5.0 | 2.8 |
| PIM-1(80 wt %)-PEI (1010) (20 wt %) | 20.4 | 25.0 | 27.0 | 22.1 | 9.5 | 4.9 | 13.4 | 46.4 | 7.8 | 5.0 |

Substitute specification

The invention claimed is:

1. A polymeric membrane comprising a blend of at least a first polymer and a second polymer, wherein the first polymer is a polymer of intrinsic microporosity (PIM) and the second polymer is a polyetherimide (PEI) polymer, or a polyetherimide-siloxane (PEI-Si) polymer, and wherein the polymeric membrane has been ultraviolet (UV)-treated and thermally-treated, wherein the membrane is capable of separating a first gas from a second gas or is capable of separating a first gas from a mixture of gases, wherein the first gas is $C_2H_4$ and the second gas is $C_2H_6$, or wherein the first gas is $C_3H_6$ and the second gas is $C_3H_8$ or wherein the first gas is $C_2H_4$ and the mixture of gases includes $C_2H_4$ and $C_2H_6$, or wherein the first gas is $C_3H_6$ and the mixture of gases includes $C_3H_6$ and $C_3H_8$ and wherein the polymeric membrane has a selectivity that exceeds the Robeson's upper bound trade-off curve.

2. The polymeric membrane of claim 1, wherein the polymeric membrane has a selectivity of $C_2H_4$ to $C_2H_6$ or a selectivity of $C_3H_6$ to $C_3H_8$ that exceeds the Robeson's upper bound trade-off curve at a temperature of 25° C. and a feed pressure of 2 atm.

3. The polymeric membrane of claim 1, wherein the membrane comprises from 80 to 95% w/w of PIM-1 and from 5 to 20% w/w of the PEI polymer.

4. The polymeric membrane of claim 1, wherein the membrane is a flat sheet membrane, a spiral membrane, a tubular membrane, or a hollow fiber membrane.

5. The polymeric membrane of claim 1, wherein the membrane comprises from 5 to 95% by weight of the first polymer and from 95 to 5% by weight of the second polymer.

6. The polymeric membrane of claim 1, where the membrane further comprises a covalent organic framework (COF) additive, a carbon nanotube (CNT) additive, fumed silica (FS), titanium dioxide ($TiO_2$) or graphene.

7. The polymeric membrane of claim 1, wherein the PIM polymer has repeating units of formula:

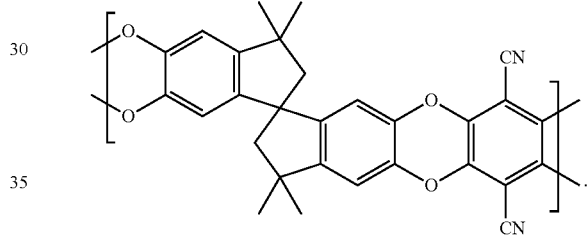

8. A method for separating at least one component from a mixture of components, the process comprising: contacting a mixture of components on a first side of the polymeric membrane of claim 1, such that at least a first component is retained on the first side in the form of a retentate and at least a second component is permeated through the membrane to a second side in the form of a permeate.

9. The method of claim 8, wherein the first component is a first gas and the second component is a second gas.

10. The method of claim 9, wherein the first gas is an olefin and the second gas is a paraffin.

11. A method of making the polymeric membranes of claim 1, the method comprising:
 (a) obtaining a mixture comprising at least a first polymer and a second polymer, wherein the first polymer is a polymer of intrinsic porosity (PIM) and the second polymer is a polyetherimide (PEI) polymer or a polyetherimide-siloxane (PEI-Si) polymer, and wherein the polymeric membrane has been ultraviolet (UV)-treated and thermally-treated, wherein the polymeric membrane has a selectivity that exceeds the Robeson's upper bound trade-off curve;
 (b) depositing the mixture onto a substrate and drying the mixture to form a membrane; and
 (c) subjecting the membrane to ultraviolet radiation and thermal treatment.

12. The method of claim 11, wherein the mixture is in liquid form and wherein the first polymer and the second polymer are solubilized within said mixture.

13. The method of claim 11, wherein the first and second polymers are homogenously blended in the membrane.

14. The method of claim 11, wherein drying comprises vacuum drying or heat drying or both.

15. The method of claim 11, wherein the membrane is UV-treated with UV radiation for 30 to 300 minutes, and wherein the membrane was thermally-treated at a temperature of to 100 to to 400° C. for 12 to 96 hours.

16. A gas separation device comprising the polymeric membrane of claim 1.

17. The gas separation device of claim 16, configured for using a flat sheet membrane, a spiral membrane, a tubular membrane, or a hollow fiber membrane.

18. The polymeric membrane of claim 1, wherein the second polymer is a PEI polymer.

19. The polymeric membrane of claim 1, wherein the second polymer is PEI-Si polymer.

* * * * *